United States Patent [19]
Sakai et al.

[11] Patent Number: 6,038,054
[45] Date of Patent: Mar. 14, 2000

[54] POLARIZED-LIGHT CONVERTING ELEMENTAL DEVICE HAVING CHOLESTERIC CRYSTAL LAYER

[75] Inventors: Yoshiharu Sakai; Kazuhiro Inoko, both of Yaita, Japan

[73] Assignee: Sharp Kabushiki Kaisha, Osaka, Japan

[21] Appl. No.: 09/045,306

[22] Filed: Mar. 20, 1998

[30] Foreign Application Priority Data

| Mar. 25, 1997 | [JP] | Japan | 9-071627 |
| Apr. 18, 1997 | [JP] | Japan | 9-101230 |
| Apr. 18, 1997 | [JP] | Japan | 9-101279 |
| Nov. 18, 1997 | [JP] | Japan | 9-316893 |

[51] Int. Cl.$^7$ .................................................. G02F 1/03
[52] U.S. Cl. ........................ 359/253; 359/247; 359/251; 359/256; 359/618; 359/629; 359/485; 359/495; 349/9; 349/115; 349/194
[58] Field of Search .................................. 359/250, 251, 359/252, 253, 247, 256, 301, 618, 629, 494, 495, 485, 488; 349/9, 115, 116, 175, 176, 194

[56] References Cited

U.S. PATENT DOCUMENTS

| 4,073,571 | 2/1978 | Grinberg et al. | 349/194 |
| 5,122,895 | 6/1992 | Takanashi et al. | 359/251 |
| 5,221,982 | 6/1993 | Faris | 349/115 |
| 5,235,443 | 8/1993 | Barnik et al. | 349/194 |
| 5,414,546 | 5/1995 | Fergason | 359/253 |
| 5,555,186 | 9/1996 | Shioya | 349/9 |
| 5,684,630 | 11/1997 | Arai | 359/495 |
| 5,751,480 | 5/1998 | Kitagishi | 359/485 |
| 5,751,482 | 5/1998 | Challener, IV | 359/485 |

FOREIGN PATENT DOCUMENTS

| 422 661 A2 | 4/1991 | European Pat. Off. . |
| 508 413 A2 | 10/1992 | European Pat. Off. . |
| 600 728 A1 | 6/1994 | European Pat. Off. . |
| 659 024 A1 | 6/1995 | European Pat. Off. . |
| 918 102 | 3/1947 | France . |

(List continued on next page.)

OTHER PUBLICATIONS

Patent Abstract of Japan. 03 192319 A Title: Projection Type Display Device, vol. 015, No. 455 (P–1277), Nov. 19, 1991, (Mitsubishi Electric Corp.).

Patent Abstract of Japan 03 192320 A Title: Projection Type Display Device, vol. 015, No. 455 (P–1277) Nov. 19, 1991, (Mitsubishi Electric Corp.).

*Primary Examiner*—Loha Ben
*Attorney, Agent, or Firm*—Dike, Bronstein, Roberts & Cushman, LLP; David G. Conlin; William J. Daley, Jr.

[57] ABSTRACT

A polarized-light converting elemental device which can produce an accurately unidirectionally and circularly polarized light with a minimized loss of light and a projection-type display device using said unidirectionally-polarized-light converting elemental device are provided. A polarized-light converting elemental device comprises a mirror glass portion consisting of an array of mirror glass blocks each having a first reflecting optical element and a second reflecting optical element and a cholesteric-liquid-crystal glass portion including a cholesteric liquid crystal layer for reflecting either clockwise circularly polarized component or anticlockwise circularly polarized component and transmitting the other. Natural light from the left side is split into two directions by the first reflecting optical element. Light reflected from the cholesteric liquid crystal is reflected by the second reflecting optical element to alter its rotation direction and then transmitted through the cholesteric liquid crystal. The construction of the element can obtain outgoing light beams having the same rotation direction and propagate in two departing directions. A projection-type display device using the unidirectionally polarized light producing element is also provided (not shown).

13 Claims, 16 Drawing Sheets

FOREIGN PATENT DOCUMENTS

| | | |
|---|---|---|
| 59-127019 | 7/1984 | Japan . |
| 2-64613 | 3/1990 | Japan . |
| 3-45906 | 2/1991 | Japan . |
| 3-192319 | 8/1991 | Japan . |
| 3-278020 | 12/1991 | Japan . |
| 4-51115 | 2/1992 | Japan . |
| 4-310903 | 11/1992 | Japan . |
| 5-66380 | 3/1993 | Japan . |
| 5-66504 | 3/1993 | Japan . |
| 5-26561 | 6/1993 | Japan . |
| 5-181135 | 7/1993 | Japan . |
| 6-19012 | 1/1994 | Japan . |
| WO 90/14606 | 11/1990 | WIPO . |

POLARIZED-LIGHT CONVERTING ELEMENTAL DEVICE HAVING CHOLESTERIC CRYSTAL LAYER

BACKGROUND OF THE INVENTION

It is well known that optical elements for converting natural light from a light source into a unidirectionally-polarized light can be used suitably for liquid crystal projectors.

In a liquid crystal projector, light from a light source illuminates a liquid crystal panel by which the light is modulated with an image and then projected through a projection lens on a screen. Incident light to be modulated in the liquid crystal panel is linearly polarized light which is usually produced through a polarizing plate. In this case, natural light emitted from a natural light source is absorbed by 50% in practice by the polarizing plate disposed at the incident side of the liquid crystal panel, resulting in a considerable loss of brightness of light. The light absorbed in the polarizing plate is converted into thermal energy to increase the temperature of the polarizing plate. To solve the above-mentioned problems, it has been proposed a polarized light converting elemental device that splits natural light into polarized components, matches the components in polarized state and propagating direction and synthesizes again the components to polarized light by using a polarized beam splitter and a cholesteric liquid crystal.

A conventional converting device using a polarized beam splitter is disclosed in Japanese Patent Publication No. 5-58899, or Japanese Utility Model Publication No. 5-26561 or Japanese Laid-Open Patent Publication No. 4-310903, or Japanese Laid-Open Patent Publication No. 5-181135. A conventional converting device using a cholesteric liquid crystal is disclosed in Japanese Laid-Open Patent Publication No. 3-45906.

However, the above-mentioned conventional polarized light converting elements involve the following problems:

In using the polarized light splitter with an optical system disclosed in Japanese Patent Publication No. 5-58899, there take place two different beams propagating in two different directions. Usually, any liquid crystal panel may present an image having a decreased contrast when it works with slant incident light other than light perpendicular to the screen. Consequently, the above-mentioned optical system may decrease the contrast of an image on the liquid crystal panel because of beams other than perpendicular. Furthermore, two separate beams propagate in two different directions and spread wider than the aperture of a projection lens used therein. Consequently, the loss of light occurs to decrease the efficiency of using incident light. In this case, the effective use of two beams can be realized by adopting an enlarged projection lens that is, however, expensive and has a large weight. The optical system has an avoidable enlargement in its size since it is designed to branch light into two separate beams. Consequently, the device with this system may have a large scale in practice.

The polarized-light converting element disclosed in Japanese Laid-Open Patent Publication No. 4-310903 may not cause the enlargement of an optical system but it has complicated construction and is difficult to manufacture.

The prior art devices using a polarized-beam splitter (Japanese Patent Publication No. 5-58899, Japanese Utility Model Publication No. 5-26561 and Japanese Laid-open Patent Publication No. 5-181135) use an expensive polarized-beam splitter and may split light into two linearly polarized beams: one beam having a polarization direction perpendicular to a plane including a light propagating direction and a normal of a beam-splitting surface of the beam splitter and the other having a polarization direction parallel to said plane. Consequently, to match the polarization directions of two beams, it is necessary to change the polarization direction of one polarized-beam by using a half-wave plate (as described in Japanese Patent Publication No. 5-58899 and Japanese Laid-open Patent Publication No. 5-181135) or through three-dimensional reflection by using a mirror or the like means (as described Japanese Utility Model Publication No. 5-26561). However, the effect of a retardation plate considerably depends upon its quality and performance. For example, a retardation plate having uneven characteristics for respective wavelengths may produce light that is differently polarized states depending upon wavelengths. Finally, the converted white-incident light may be colored after passing through polarizing plate. The use of a three-dimensionally disposed mirror may be not effective in practice because of difficulty of synthesizing two converted beams after reflection. Furthermore, this may unavoidably increase the sizes of the system and device.

On the other hand, the conventional polarized light converting elemental device using a cholesteric liquid crystal has the following drawbacks:

The cholesteric liquid crystal has such characteristic that it can selectively reflect either clockwise or anticlockwise circularly polarized component of natural light of a selected range of wavelengths. This characteristic is most noticeably realized with incident light perpendicular to the cholesteric liquid crystal and not completely realized with incident light falling at angles onto the cholesteric liquid crystal.

Consequently, the optical system described in claim 6 of Japanese Laid-open Patent Publication No. 3-45906 can not effectively use the performance of the cholesteric liquid crystal with a beam of light entering the liquid crystal at a large incident angle. In short, the efficiency of using the polarized light is not so much improved. An optical system disclosed in claims 2 to 5 of Japanese Laid-open Patent Publication No. 3-45906, wherein a light beam is split and once fed back to a lamp reflector, can obtain the incident light beam perpendicular to the cholesteric liquid crystal but cannot attain the expected result since the light reflected from the cholesteric liquid crystal is interfered in its optical path by light reflected and dispersed by glass of the lamp and widely spread light from the light source and, in practice, only a small portion of the light can be returned to the cholesteric liquid crystal.

Japanese Laid-Open Patent Publication No. 3-192319 discloses a projection-type display device in which one of two polarized beams separated by the polarized-light separating optical element is doubly reflected to obtain the same polarization direction as that of the other polarized beam. The polarized-light rotating means of the device disclosed in Japanese Laid-Open Patent Publication No. 3-192319 rotates the polarization direction of one linearly polarized beam by doubly reflecting the beam by the mirror whose incident plane (a plane including the optical axis of the incident light and the normal of a mirror surface of the polarized-light rotating means at a point where the optical axis and the mirror surface intersect) is tilted at an angle of 45° from the polarization direction of the linearly polarized beam separated by a polarized-beam splitter. However, the polarization directions of the linearly polarized beams separated by the conventional polarized-light separating means are, respectively, perpendicular and parallel to the paper surface. Consequently, the mirror must be disposed in such a way that the polarization direction of the linearly polarized beam makes an angle of 45° with the incident plane of the mirror. This necessarily causes the optical path of principal ray to be three-dimensionally located. Although the optical path is illustrated as two-dimensionally disposed in Japanese Laid-Open Patent Publication No. 3-192319, two separated beams can not be presented in practice on the same paper surface.

SUMMARY OF THE INVENTION

The present invention relates to an optical system or an optical elemental device for converting natural light to a unidirectionally-polarized-light and a projection-type display device using the optical elemental device.

The present invention was made to provide a polarized-light converting optical system, a polarized-light converting elemental device and a polarized-light converting elemental device array, all of which are capable of effectively and accurately converting natural incident light into unidirectional linearly polarized light. They are simple and may facilitate miniaturization. The present invention also provides a projection-type display device which is capable of obtaining a bright image by using any one of the above-mentioned optical components.

(1) One object of the present invention is to provide a polarized-light converting elemental device which is provided with a cholesteric liquid crystal layer for reflecting either one of clockwise circularly polarized light and anticlockwise circularly polarized light and transmitting the other, a first reflecting optical element array composed of a plurality of first reflecting optical elements arranged in an array and a second reflecting optical elemental device array composed of a plurality of second reflecting optical elements arranged in an array. In this element, the first reflecting optical element array is disposed to reflect a part of natural light falling on a surface of the polarized-light converting elemental device and transmit the remaining part of the natural light that is split into two light components propagating in two respective directions and entering into the cholesteric liquid crystal layer at first and second different incident angles respectively, and the second reflecting optical element array reverses a rotation direction of circularly polarized light reflected from the cholesteric liquid crystal and causes respective light rays to enter into the cholesteric liquid crystal at the first and second incident angles respectively, thereby all the components of light reflected by the first and second reflecting optical element arrays enters the cholesteric liquid crystal and emerge therefrom as circularly polarized light rays having the same rotating direction and departing in two different directions. The circularly polarized light beams having the same rotation direction and propagating in two different directions further pass through a retardation plate by which it is converted to linearly polarized light suitable for illuminating liquid crystal display devices and liquid crystal projectors. The light beams outgoing in two directions at a specified angle are particularly effective for illuminating a liquid crystal panel.

(2) Another object of the present invention is to provide a polarized-light converting elemental device that has the construction defined in the above item (1) and further featured in that the first reflecting optical-element array, the second reflecting optical-element array and the cholesteric liquid crystal layer are combined with glass plates to form a single solid unit. This elemental device makes it possible to enter light into the cholesteric liquid crystal at a small incident angle by utilizing the refracting effect of glass.

(3) Another object of the present invention is to provide a polarized-light converting elemental device as defined in the above item (1) or (2), which comprises an array of reflecting optical element blocks, each of which composed of a glass block with a first reflecting optical element disposed thereon and a second optical element disposed thereon, and a cholesteric-liquid-crystal glass portion composed of a cholesteric liquid-crystal sandwiched between two sheets of glass. This provides a more practical construction of a polarized-light converting elemental device using glass sheets.

(4) Another object of the present invention is to provide a projection-type display device which comprises a polarized-light converting elemental device defined in any one of the above items (1) to (3), a retardation plate (quarter-wave plate) for converting circularly polarized light from the polarized-light converting elemental device into linearly polarized light, a transmission-type light valve for modulating the linearly polarized light and a projecting means for projecting the linearly polarized light and can attain an improved efficiency of using light by eliminating the 50%-loss of light in the incident polarizing plate of the liquid-crystal panel.

(5) Another object of the present invention is to provide a polarized-light converting elemental device which comprises a first lens portion for collecting natural light, a cholesteric liquid crystal for reflecting either one of the clockwise and anticlockwise components of circularly polarized light and transmitting the other, a reflecting optical element disposed in an optical path between the first lens portion and the cholesteric liquid crystal and having an opening provided therein for passing the collected light to reverse the direction of rotation of circularly polarized light reflected form the cholesteric liquid crystal and re-reflecting the light toward the cholesteric liquid crystal, a second lens portion for entering therein light having passed through the cholesteric liquid crystal without being re-reflected by the reflecting optical element, a third lens portion for entering therein light having re-reflected by the reflecting optical element and passed through the cholesteric liquid crystal, wherein natural light collected through the first lens portion is converted to circularly-polarized light rotating in the same direction, which then passes through the second and third lens portions. This elemental device provided with the optical system can control an area of radiation with light after polarization by optimally adjusting the focal distance and the aperture of the respective lens system to convert the polarized light without causing unevenness of radiation intensity. The obtained circularly-polarized-light can be easily converted to linearly polarized light by using, e.g., a retardation plate. The converted light can be suitably used for liquid crystal display units and liquid crystal projectors.

(6) Another object of the present invention is to provide a polarized-light converting elemental device as defined in the above item (5), which is characterized in that components of the converting elemental device are arranged so that light outgoing from the second and third lens portions are parallel rays when the natural light incoming into the first lens portion is parallel. This device can obtain unidirectional circularly-polarized parallel rays that can be suitably used for liquid crystal display units and liquid crystal projectors.

(7) Another object of the present invention is to provide a polarized-light converting elemental device as defined in the above item (5) or (6), which is characterized in that the cholesteric liquid crystal and the reflecting optical element are disposed at an angle relative to the optical axis of the incident natural light not to allow the light reflected from the cholesteric liquid crystal to pass through the opening provided in the reflecting optical element, thus eliminating loss of the light. This improves the efficiency of using incident light.

(8) Another object of the present invention is to provide an array of polarized-light converting elemental device defined in any one of the above items (5) to (7), which is featured in particular by that it has an improved uniformity of light intensity and saved size and weight and can be manufactured at a low cost.

(9) Another object of the present invention is to provide a projection-type display device which comprises the polarized-light converting elemental device defined in any one of the above items (5) to (7) or an array of the polarized-light converting elemental device defined in the above item (8), a light source, a retardation plate for converting circularly polarized light from the polarized-light converting elemental device or the polarized-light converting elemental device array into linearly polarized light, a transmission-type light valve for modulating the linearly polarized light and projecting means for projecting the linearly polarized light and which can project a bright image by using full of incident light. This is realized by eliminating such a loss of light as resulted from the 50% light-absorption by the polarizing plate in the conventional device.

(10) Another object of the present invention is to provide a polarized-light converting optical system which comprises a polarized-light separating optical element having a polarized-light separating surface for separating natural light into two linearly polarized beams whose polarization directions being perpendicular to each other and making an angle of 45° with a plane including a traveling direction of a principal ray of natural light and including the normal of the polarized-light separating surface at a point where the principal ray travelling direction and the polarized-light separating surface intersect, and polarized-light rotating means for rotating the polarization direction of either one of two separated linearly polarized beams by 90° by reflecting said beam twice. This optical system can effectively and accurately convert natural incident light into unidirectional linearly polarized light and is featured by its simple and compact construction.

(11) Another object of the present invention is to provide a polarized-light converting optical system which comprises a polarized-light separating optical element having a polarized-light separating surface for separating natural light into two linearly polarized beams whose polarization direction being perpendicular to each other and making an angle of 45° with a plane including a traveling direction of a principal ray of natural light and including the normal of the polarized-light separating surface at a point where the principal ray travelling direction and the polarized-light separating surface intersect, and totally-reflecting means for converting either one of two separated linearly polarized beams into an elliptically polarized beam having a major axis parallel to a polarization direction of the other separated beam by totally reflecting the beam to be converted. This system can obtain a linearly polarized beam and an elliptically polarized beam, both beams having the same polarization direction, by separating natural light into two linearly polarized beams and totally reflecting one of two beams. This optical system realizes an increased efficiency of using incident light by using light that is lost in the conventional device.

(12) Another object of the present invention is to provide a polarized-light converting optical system which has the structure defined in the above item (11) and further includes a retardation plate for converting the elliptically-polarized beam reflected from the totally reflecting means into a linearly polarized beam and can therefore convert the elliptically polarized light obtained by total reflection into the linearly polarized light, thus realizing a highly linearly polarized light producing system.

(13) Another object of the present invention is to provide a polarized-light converting optical system which is constructed as defined in any one of the above items (10) to (12) and featured in that the polarized-light separating element is a multilayer polymer-film composed of layers of plural stretched-polymer-films having anisotropic refractive indexes and matched stretch direction, wherein the adjoining polymer films have different refractive indexes in the stretched direction on their surface and the same refractive index in the direction perpendicular to the stretched direction on their surface. This optical system is simple and compact and can realize further miniaturization by using the polarized-light converting optical element.

(14) Another object of the present invention is to provide a polarized-light converting elemental device which effectively and accurately convert incident natural light into unidirectional polarized light and has a simple and compact construction that includes a polarized-light separating optical component having a polarized-light separating surface for separating natural light into two linearly polarized beams whose polarization direction being perpendicular to each other and making an angle of 45° with a plane including a propagating direction of a main beam of natural light and including a normal of the polarized-light separating surface at a point where the principal ray traveling direction and the polarized-light separating surface intersect, and polarized-light rotating means for rotating the polarized direction of either one of two separated linearly polarized beams by 90° by reflecting said beam twice.

(15) Another object of the present invention is to provide a polarized-light converting elemental device which includes a polarized-light separating optical component having a polarized-light separating surface for separating natural light into two linearly polarized beams whose polarization direction being perpendicular to each other and making an angle of 45° with a plane including a traveling direction of a principal ray of natural light and including the normal of the polarized-light separating surface at a point where the principal ray travelling direction and the polarized-light separating surface intersect, and totally-reflecting means for converting either one of two separated linearly polarized beams into an elliptically polarized beam having a major axis parallel to a polarization direction of the other separated beam by totally reflecting the beam to be converted. This polarized-light converting elemental device can obtain a linearly polarized beam and an elliptically polarized beam, both beams having the same polarization direction, by separating natural light into two linearly polarized beams and totally reflecting one of two beams, thus realizing an increased efficiency of using incident light by using reflected light that is lost in a conventional device.

(16) Another object of the present invention is to provide a polarized-light converting optical elemental device which is constructed as defined in the above item (15) and further includes a retardation plate for converting the elliptically-polarized beam reflected from the totally reflecting means into a linearly polarized beam and can therefore convert the elliptically polarized light obtained by total reflection into the linearly polarized light, thus realizing a highly linearly polarized light producing system.

(17) Another object of the present invention is to provide a polarized-light converting elemental device which is constructed as defined in any one of the above items (14) to (16) and uses a polarized-light separating component that is a multilayer polymer-film composed of layers of plural stretched-polymer-films having anisotropic refractive indexes and matched stretch direction, wherein the adjoining polymer films have different refractive indexes in the stretched direction on their surface and the same refractive index in the direction perpendicular to the stretched direction on their surface. The polarized-light separating elemental device is simple and can realize further miniaturization of the polarized-light converting elemental device.

(18) Another object of the present invention is to provide a polarized-light converting elemental device array which is composed of plural polarized-light converting elemental device defined in any one of the above items (14) to (17) and which array is simple, compact and inexpensive and can effectively and accurately convert incident natural light into unidirectional polarized light.

(19) Another object of the present invention is to provide a projection-type display device which can project a bright image by effectively using incident light and includes a polarized-light converting optical system defined in any one of the above items (10) to (13) or a polarized-light converting elemental device defined in any one of the above items (14) to (17) or a polarized-light converting elemental device array defined in the above item (18), a light source, a transmission-type light valve for modulating light and a projecting optical means.

Figure 1A:
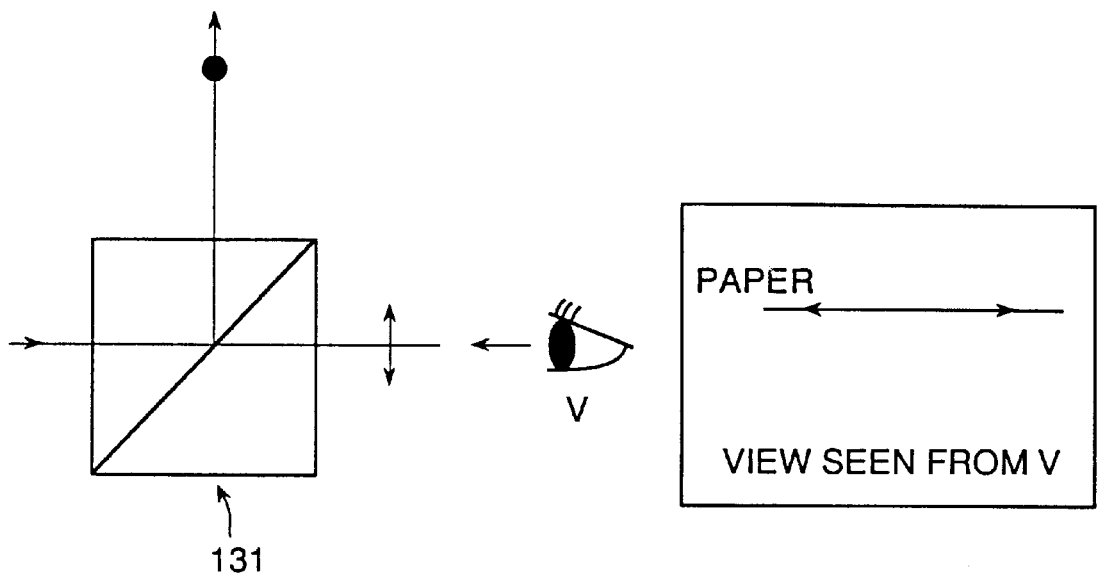
FIG. 1A is a view for explaining an example of a polarization direction of a beam separated by polarized-light separating means according to the prior art.

PREFERRED EMBODIMENT OF THE INVENTION (Embodiment 1)

The present invention is directed to an optical elemental device for converting natural light emitted from a light source to unidirectionally polarized light, which is realized by using a first reflecting optical element, a cholesteric liquid crystal and a second reflecting optical element.

An aspect of the present invention is a unidirectionally-polarized-light producing element which comprises reflecting means (first reflecting optical element) for splitting natural light from the light source into two beams reflected at two different angles, a cholesteric liquid crystal for further splitting each beam of natural light into two circularly polarized components and a reflecting optical element (second reflecting optical element) for matching polarized state and propagating direction of light reflected from the cholesteric liquid crystal with those of transmitted light.

Another aspect of the present invention is polarized-light converting elements which are realized by integrally assembling or combining the above mentioned first and second reflecting elements and the cholesteric liquid crystal by using glass blocks.

Another aspect of the present invention is a projection-type display device comprising a light source of natural white light, a transmitting-type light valve for modulating only one of two polarized components of the source light and shutting off the other component and a projection display for projecting modulated light, which device is provided with a any one of above mentioned unidirectionally polarized light producing element and a retardation plate for converting circularly-polarized light to linearly polarized light.

Referring to accompanying drawings, a projection-type display device with a unidirectionally-polarized-light producing element according to the present invention will be practically described below:

In all the drawings, like reference characters denote like parts in various views and repeated description of the same parts is omitted.

(Embodiment 1-A)

Figure 2:
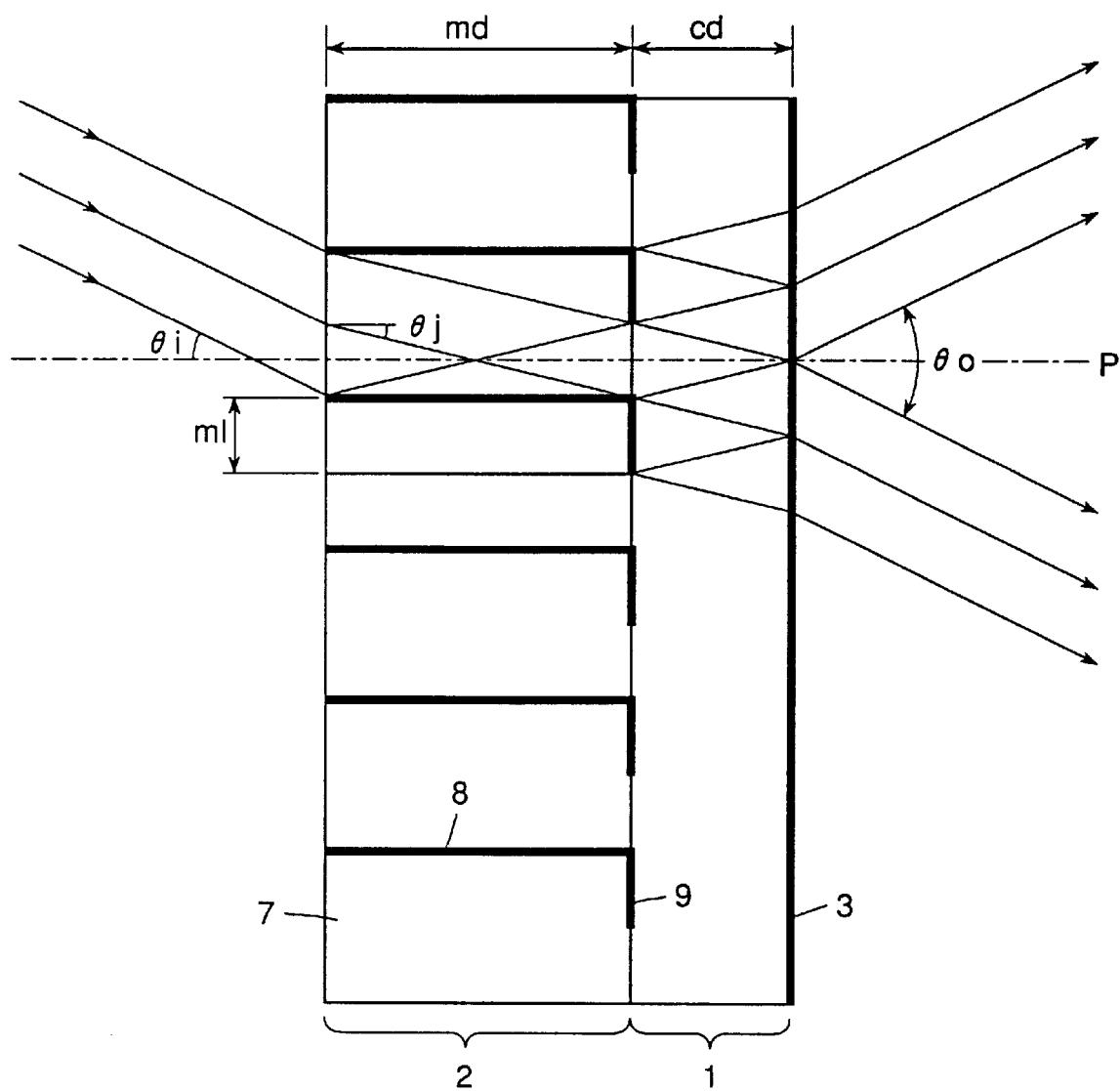
FIG. 2 is a view for explaining a polarized-light converting elemental device according to the embodiment 1-A of the present invention by conceptually representing its construction in cross-section and optical paths therethrough.

FIG. 2 is a cross-sectional view for explaining a polarized-light converting elemental device with conceptual representation of optical paths therein, which is the embodiment 1-A of the present invention. In FIG. 2, there are shown a cholesteric-liquid-crystal portion 1 of thickness "cd", an incident mirror-glass portion 2 of thickness "md" and a second deposited mirror of length "ml", a cholesteric-liquid-crystal 3, a mirror-glass block 7, a first deposited mirror portion 8.

Figure 3:
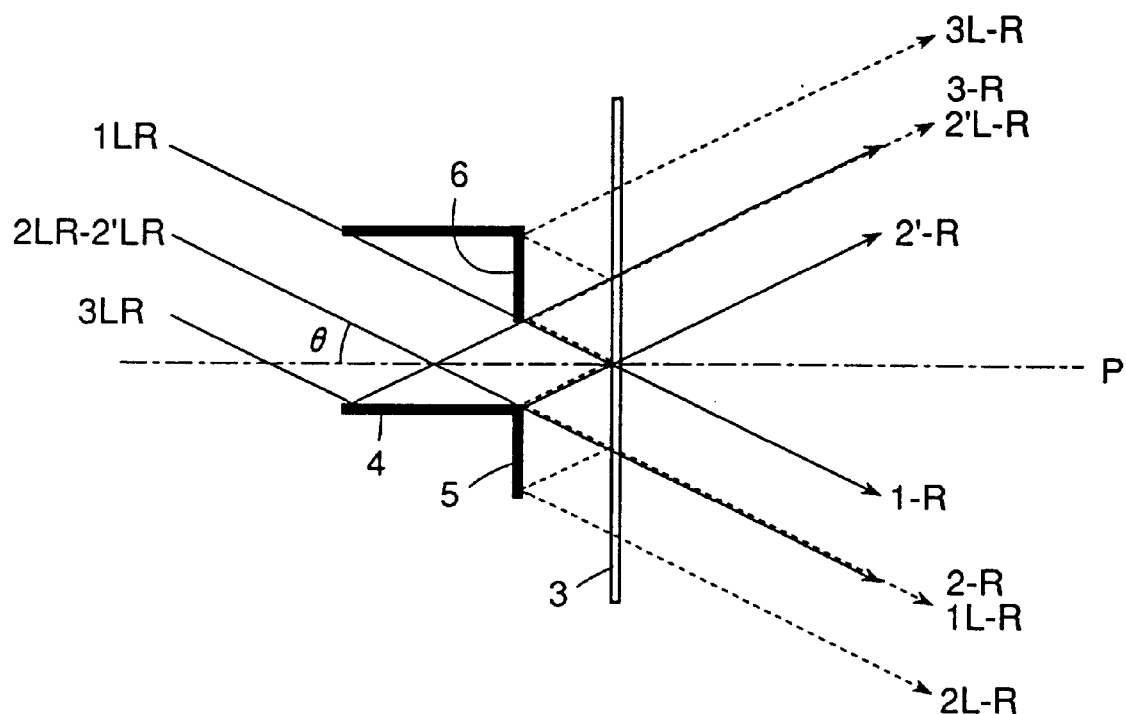
FIG. 3 is a view for explaining the concept of changing the rotation direction of light by combination of a cholesteric liquid crystal with reflecting optical elements.

FIG. 3 is illustrative of an exemplified optical action of a cholesteric liquid crystal in combination of reflecting optical elements for alternating the rotation direction of polarized light. In FIG. 3, there are shown, a first reflecting optical element 4, a second reflecting optical element 5, a third reflecting optical element 6 (the same as the second reflecting optical element but is refered to as the third reflecting optical element for the sake of explanation). Character P denotes a line perpendicular to the cholesteric liquid crystal.

Figure 4:
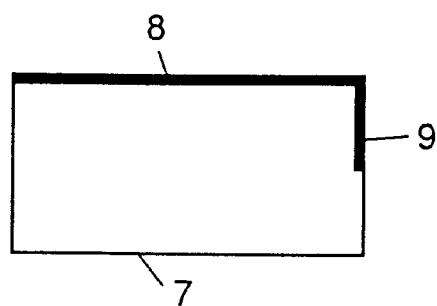
FIG. 4 is a view for explaining the construction of an incident mirror-glass shown in FIG. 2.

FIG. 4 is a view for explaining the construction of the incident mirror-glass portion of FIG. 2.

The principle of producing a unidirectionally polarized light by the cholesteric liquid crystal is as follows: It is known that the cholesteric liquid crystal can split natural light into two (clockwise and anticlockwise) circularly polarized components. In other words, natural light is synthesized of clockwise circularly polarized light and anti-clockwise circularly polarized light. When the natural light falls on the cholesteric liquid crystal which possesses the characteristic of transmitting, e.g., only clockwise circularly polarized rays, anticlockwise circularly polarized rays are reflected. Consequently, the light rays passed through the cholesteric liquid crystal are unidirectional (clockwise in this case) circularly-polarized rays.

On the other hand, the circularly polarized light reflected from the cholesteric liquid crystal may alter its rotation direction by 180° when it is further reflected from the reflecting optical element. Consequently, the light reflected from reflecting optical element may enter the cholesteric liquid crystal and passes therethrough. Thus, the cholesteric liquid crystal produces circularly polarized light having the same rotation direction.

Referring to FIG. 3, the optical action of the cholesteric liquid crystal in combination with the reflecting optical element when converting natural light into unidirectionally-circularly-polarized light will be described below:

Incident light rays 1LR and 2LR entering the cholesteric liquid crystal at an angle θ formed with the perpendicular P reaches the cholesteric liquid crystal 3 without being prevented by the first, second and third optical elements 4, 5 and 6. Now, it is supposed that the cholesteric liquid crystal 3 allows the clockwise circularly polarized component of light to pass therethrough and reflects the anticlockwise circularly polarized component. Accordingly, clockwise circularly polarized components of the light rays 1LR and 2LR pass through the cholesteric liquid crystal. These transmitted components are expressed by characters 1-R and 2-R respectively.

Anticlockwise circularly polarized components of the incident light rays 1LR and 2LR are reflected from the cholesteric liquid crystal 3, reach the second reflecting optical element 5 whereby it is reflected and becomes clockwise circularly polarized light. The light components reflected from the second reflecting optical element reaches the cholesteric liquid crystal 3 and pass therethrough. These transmitted light rays are denoted by characters 1L-R and 2LR.

On the other hands, incident light rays 2'LR and 3LR are reflected from the first reflecting optical element 4 at an incident angle θ and reach the cholesteric liquid crystal 3. The clockwise-circularly-polarized components of the incident rays 2'LR and 3LR pass through the cholesteric liquid crystal 3. These transmitted rays are denoted by characters 2'-R and 3-R respectively. The anticlockwise-circularly-polarized components of the incident rays 2'LR and 3LR are reflected from the cholesteric liquid crystal 3 and reach the third reflecting optical element 6 whereby they are reflected and become clockwise circularly polarized rays. These rays reflected from the third reflecting optical element 6 reach the cholesteric liquid crystal 3 and pass therethrough. The transmitted light rays are denoted by characters 2'L-R and 3L-R. Thus the light rays 1LR, 2LR, 2'LR and 3LR having entered the cholesteric liquid crystal at the incident angle θ emerge therefrom as clockwise circularly polarized rays with a diverging angle of 2θ.

In this embodiment 1-A of the invention, the incident mirror-glass portion 2 is constructed of a plurality of glass blocks (FIG. 4) laid one over another. A mirror glass block 7 is provided with the first deposited-mirror portion 8 corresponding to the first reflecting optical element 4 (FIG. 3) and the second deposited-mirror portion 9 corresponding to the second reflecting optical element 5 (FIG. 3). In two mirror glass blocks laid one over another, the second deposited mirror portion 9 of the upper mirror block 7 serves as the third reflecting optical element 7 (FIG. 3). Accordingly, the second reflecting optical element 5 (deposited mirror-portion 9) of each mirror glass block may doubly function.

In FIG. 3, the cholesteric-liquid-crystal glass portion 1 comprises cholesteric liquid 3 sandwiched between two sheets of glass. The two glass portions 1 and 2 are laid over each other to form the embodiment 1-A of the present invention.

Now let us study the case of producing circularly polarized light having the same rotating direction and departing at a diverging angle $\theta_o$ by using the embodiment 1-A of the present invention. The refractive index of glass used for both incident mirror-glass portion 2 and cholesteric-liquid-crystal glass portion 1 is assumed to be the same value $n_1$. Since an incident light is refracted when it enters into the glass and emerges therefrom into air, an incident angle of light may be determined in practice as a half of diverging angle $\theta_o$ of the outgoing light, ignoring the influence of the refractive index of the glass. Therefore, the incident angle $\theta_i$ is expressed as follows: $\theta_i = \theta_o/2$ Expressing the refractive index of the incident side medium (air) as $n_o$ ($n_o=1$ in air), refractive index of the glass as n1, thickness of the cholesteric liquid crystal glass portion 1 as cd, thickness of the incident mirror glass portion 2 (mirror glass block) as md and length of the second deposited mirror portion 9 as m1, the correlation of sizes of the portions is examined as follows:

The refraction angle of light in glass is determined according to the refractive index of the glass: $\theta_j = \sin^{-1}(n_o \sin \theta_i/n_1)$ The thickness md of the mirror glass block is determined as follows: md=ml/tan $\theta_j$ The length ml of the second deposited mirror portion 9 is determined as follows: ml=2cd×tan $\theta_j$. Therefore, the correlation between the thickness md of the mirror glass block and the thickness cd of the cholesteric liquid crystal glass portion can be expressed as md=2cd.

If the divergence angle $\theta_o$ of the outgoing light is equal to 16° and the thickness cd of the cholesteric-liquid-crystal glass portion is equal to 1.6 mm, the incident angle $\theta_i$ is determined to be equal to 8°. The refraction angle $\theta_j$ of the light in the glass is equal to 5.25°, the thickness md of the mirror glass block is 3.2 mm and the length ml of the second deposit mirror portion is 0.294 mm. The incident angle of the light upon the cholesteric liquid crystal 3 is equal to 5.25° (in the glass) which is small enough to effectively use the characteristic performance of the cholesteric liquid crystal 3.

Figure 5:
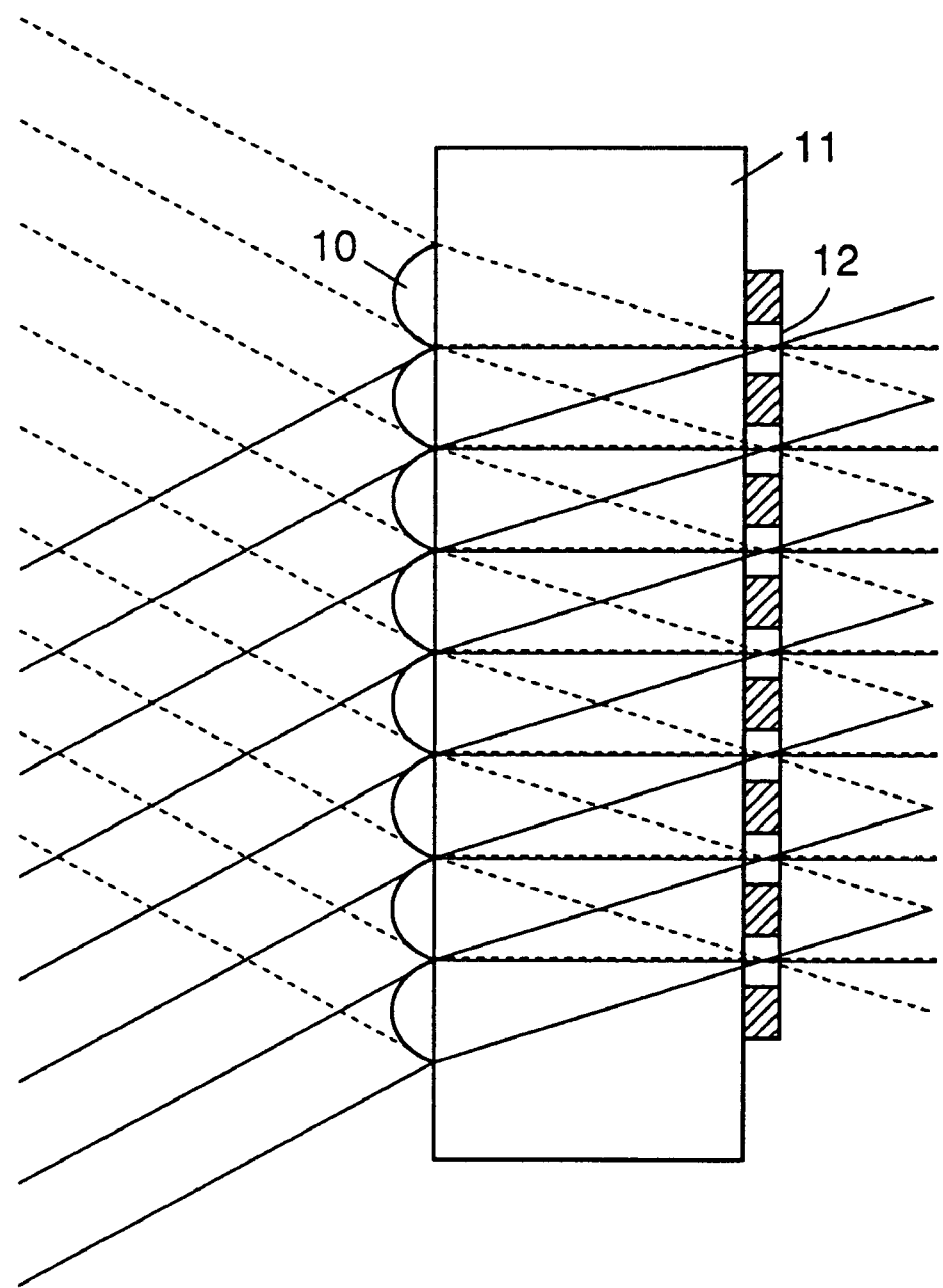
FIG. 5 is a conceptual illustration of light paths in an exemplified construction of a liquid crystal panel for a liquid projector using a polarized-light converting elemental device according to the present invention.

FIG. 5 depicts an example of a liquid crystal panel with optical paths therein, which composes a liquid crystal display device using a circularly-polarized-light converting elemental device according to the present invention. In FIG. 5, there are shown a micro lens array 10, a liquid crystal portion 11 and an opening 12 composing a pixel. Light diverging at two angles from the polarized-light converting elemental device converges through the micro lens array 10 to pixel openings 12. As is apparent from FIG. 5, light rays coming from respective directions fall onto each pixel. This means that each pixel is illuminated in two directions. In other words, every pixel receives doubled illumination in comparison with pixels illuminated in one direction in the conventional display device. The two-directional illumination can be, of course, realized without using micro lens array. Therefore, the element according to the present invention can be effectively applied for a liquid crystal panel with no micro-lens array.

(Embodiment 1-B)

Figure 6:
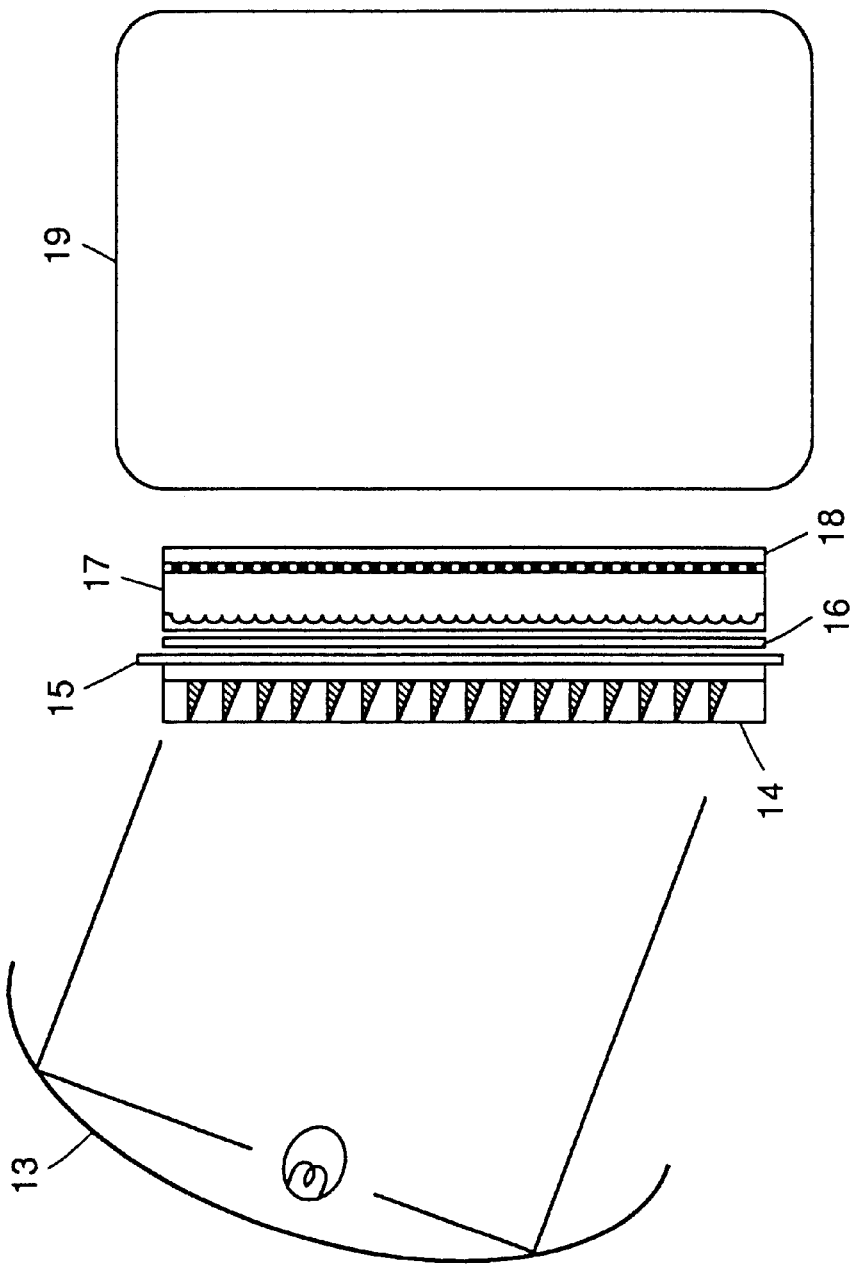
FIG. 6 is a conceptual illustration of an exemplified construction of a liquid crystal projector using a combination of a polarized light converting elemental device with a liquid crystal panel.

FIG. 6 depicts an example of a liquid crystal projector using a combination of a liquid crystal panel with a polarized-light converting elemental device according to the present invention. As shown in FIG. 6, the liquid crystal projector comprises a parabolic reflector 13 for producing parallel rays of light from a light source, a polarized-light converting elemental device 14 according to the present invention, a retardation ($\lambda/4$) plate 15, an incident polarizing plate 16, a liquid crystal panel 17 and outgoing polarizing plate 18 and a projecting lens 19. Light having entered into the polarized-light converting elemental device 14 emerges therefrom as light beams having the same rotation direction and propagating in two different directions and then enters into a retardation ($\lambda/4$) plate 15 whereby the circularly polarized light is converted to linearly polarized light that reaches the liquid crystal panel 17. The incident polarizing plate 16 is provided to further improve the linearlity of polarized light. The light modulated with an image in the liquid crystal panel 17 is transmitted or shut off by the outgoing polarizing plate 18 according to the brightness of the image. The modulated light is projected through the projection lens 19 to form the image on a display screen.

(Embodiment 2)

According to the embodiment 2, a polarized-light converting elemental device having light splitting means for splitting natural light from the light source into two polarized-light components, matching means for matching rays of each component light in polarized state and propagating direction and synthesizing means for combining two components is implemented with a first lens portion for correcting rays of light, a cholesteric liquid crystal for separating the collected light into two circularly polarized-light groups, a reflecting optical element for matching the polarized state and propagating direction of the light reflected from the cholesteric crystal with those of the light transmitted therethrough and second and third lens portions for restoring the light collected by the first lens portion.

And according to the embodiment 2, a polarized-light converting elemental device having light splitting means for splitting natural light from the light source into two polarized-light components, matching means for matching rays of each component light in polarized state and propagating direction and synthesizing means for combining two components is implemented with a first lens portion for correcting rays of light, a cholesteric liquid crystal for separating the collected light into two circularly polarized-light groups, a reflecting optical element for matching the polarized state and propagating direction of the light reflected from the cholesteric crystal with those of the light transmitted therethrough and a second lens portion for restoring the light collected by the first lens portion. The element is characterized by that the cholesteric crystal and the reflecting optical element are disposed at an angle relative to the optical axis of the incident natural light to increase the income of reused light.

The present invention is directed to an array of the above mentioned polarized-light converting elemental devices, which has a reduced thickness and attains an improved uniformity of light intensity.

According to the embodiment 2, a projection type display device that modulates one of polarized components among white natural light from a natural light source and shuts off the other by a transmission light valve and projects the modulated light. The device is further provided with the above mentioned polarized-light converting elemental device or an array of the polarized-light converting elemental devices and a retardation plate for converting circularly polarized light to linearly polarized light.

The difference of the embodiment 2 from the prior art disclosed in Japanese Laid-Open Patent Publication No. 3-45906 is described below:

The device according to the embodiment 2 has an incident-side lens and an outgoing side lens to increase the efficiency of using incident light.

In the prior art device constructed as shown in FIG. 1 of Japanese Laid-Open Patent Publication No. 3-45906, incident light is converted therein to polarized light that is emerges therefrom as a beam having an enlarged diameter. In the other words, the emerged light as compared with the light before conversion has an enlarged illuminating area with less flux density and a possibly increased unevenness of flux density distribution in the area. The device allows incident light in dispersed state to enter, be converted and emit. Consequently, the light emitted therefrom may have a very large angle of its flux distribution. This light is undesirable to use for illuminating, for example, an optical system of a liquid crystal projector that requires parallel rays of incident light. On the contrary, the device according to the embodiment 2 is provided with the lens system that can optimally regulate the focal distances and aperture sizes of respective lenses to obtain parallel rays of light maintaining the same illuminating area with the same uniform flux density that is suitably used for illuminating the liquid crystal projector.

A device according to the embodiment 2 can produce an increased amount of converted light by tilting a cholesteric liquid crystal and a mirror to the optical axis.

A device according to the embodiment 2 is an array of polarized-light converting elemental devices which elemental devices are adaptively assembled with each other to attain a reduced thickness and an improved uniformity of the light intensity.

The prior device art disclosed as shown in FIG. 1 of Japanese Laid-Open Patent Publication No. 3-45906 intakes a part of dispersed light emitted from a light-source and converts it to polarized light. On the contrary, the device according to the present invention allows all the incident parallel rays of light and converts all of them to polarized light. Although claims of the present invention do not describe how to prepare the parallel rays of the incident light, the parallel light may be such that light emitted from the light source is once collected by a reflector as in the optical system of the device of the present invention. In this case, the device according to the present invention can more effectively use incident light than the prior art device.

Referring to accompanying drawings, a projection-type display device with an unidirectionally-polarized-light converting element according to the present invention will be practically described below:

In all the drawings, like reference characters denote like parts in various views and repeated description of the same parts is omitted.

(Embodiment 2-A)

Figure 7:
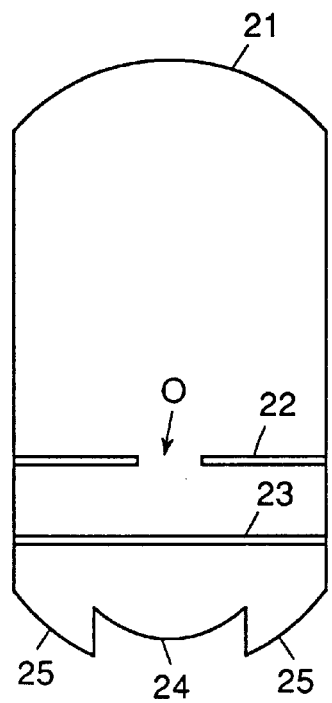
FIG. 7 is a side view for explaining a polarized-light converting elemental device according to the embodiment 2-A of the present invention.

FIG. 7 is a side view for explaining a polarized-light converting elemental device according to embodying the embodiment 2-A. In FIG. 7, there are shown a first lens portion (incident-side lens) 21, a mirror 22, a cholesteric liquid-crystal portion 23, a second lens portion (first emitting-side lens portion) 24, a third lens portion (second emitting-side lens portion) 25 and an opening O.

Figure 8:
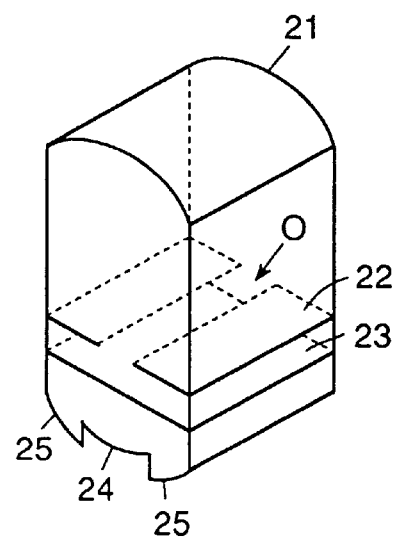
FIG. 8 is a perspective view of the embodiment 2-A shown in FIG. 7.

FIG. 8 is a perspective view of the embodiment 2-A shown in FIG. 7.

Figure 9:
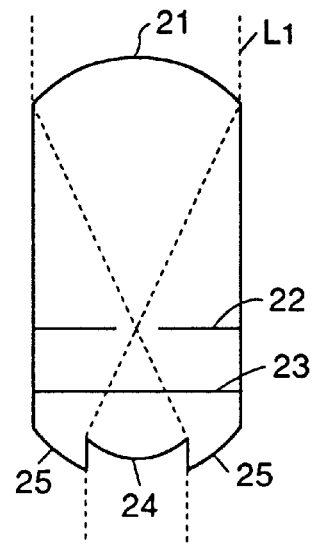
FIG. 9 is a conceptual illustration of a part of optical path in the embodiment 2-A shown in FIG. 7.
Figure 10:
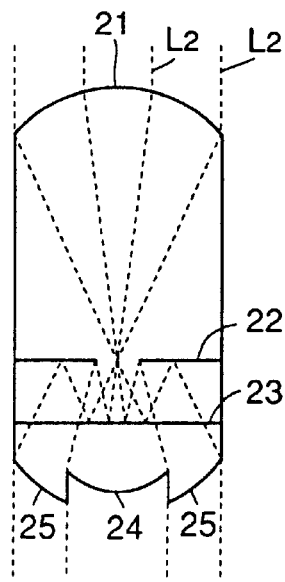
FIG. 10 is a conceptual illustration of a part of an optical path in the embodiment 2-A shown in FIG. 7.

FIGS. 9 and 10 are conceptual representation of a partial optical path in the embodiment 2-A shown in FIG. 7 where character L1 denotes polarized light components having the rotation direction transmittable through the cholesteric liquid crystal and character L2 denotes polarized light components rotating in the direction to be reflected from the cholesteric liquid crystal.

Figure 11:
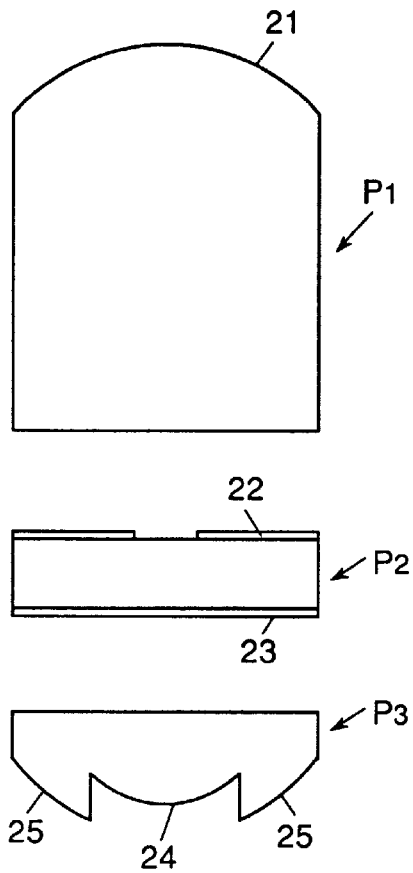
FIG. 11 is a conceptual side view for explaining a method for manufacturing a polarized light converting elemental device according to the embodiment 2-A shown in FIG. 7.

FIG. 11 is a view for explaining an exemplified method of preparing a polarized-light converting elemental device shown in FIG. 7. In FIG. 7, there is shown a side view of parts P1, P2 and P3 composing the polarized-light converting elemental device.

Parallel rays of incident natural light pass through the first lens portion 21 and converge at a plane where the mirror 22 is disposed. The opening O is provided in the plane of the mirror 22 on which the parallel rays through the first lens portion 21 are focused. The opening O has a selected width at which an eclipse of a light-source image cannot occur therein. The light rays converged at the focal plane is split by the effect of the cholesteric liquid crystal into two circularly-polarized-light components that are different from each other by rotating direction. (Natural light is considered as light synthesized of clockwise circularly polarized component and anticlockwise circularly polarized component. The cholesteric liquid crystal possesses a unique property of reflecting either one of the clockwise and anticlockwise components of circularly polarized light and transmitting only the other. In the shown case, there is used a wide-band cholesteric liquid crystal capable of selecting all visible light frequencies. It is also possible to use cholesteric liquid crystals that possess selecting bands R, G and B respectively.)

FIG. 9 shows an optical path of a circularly-polarized beam L1 that is one of the two beams circularly polarized in different rotating directions and is allowed to pass through the cholesteric liquid crystal 23. The beam circularly polarized in the transmittable-direction of rotation passes through the cholesteric liquid crystal 23 and the second lens portion 24 from which it emerges as a parallel beam.

FIG. 10 shows an optical path of a circularly-polarized beam L2 that is one of the two beams separated from each other by their polarization direction and is reflected from the cholesteric liquid crystal 23. The light beam reflected from the cholesteric liquid crystal 23 is reflected again by the mirror 22, being converted to a beam circularly polarized in the reversed rotation direction. Consequently, the light reflected from the mirror 22 passes through the cholesteric liquid crystal 23 and enters the third lens portion 25 in which it is converted to a parallel beam and emitted therefrom. Thus, the cholesteric liquid crystal produces circularly polarized beams having the same rotation direction.

The polarized-light converting elemental device can be manufactured in practice from three parts P1, P2 and P3 shown in FIG. 11. The parts P1 and P3 are cylindrical lenses each having a plano-convex section. Part P2 is a common glass plate that has mirror 22 deposited on the incident-side surface at a specified gap to form a light-admitting opening (aperture) and has a wide-band cholesteric-liquid-crystal film as the cholesteric liquid crystal 23 bonded to the light-emitting-side surface. The parts P1, P2 and P3 are made of the same glass material having the same refractive index. These parts are joined with each other with an interlayer of matching oil having the same refractive index.

This method can be applied for manufacturing polarized-light converting elemental devices according to the embodiments 2-B and 2-C of the present invention.

(Embodiment 2-B)

Figure 12:
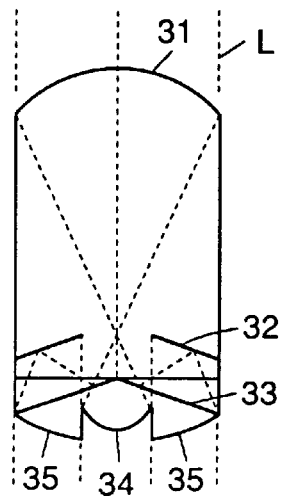
FIG. 12 is a side view for explaining a polarized-light converting elemental device according to the embodiment 2-B.

FIG. 12 is a side view of a polarized-light converting elemental device according to of the embodiment 2-B. In FIG. 12, there is shown a construction of the polarized-light converting elemental device with conceptually illustrated optical paths. The device includes a first lens portion (incident-side lens) 31, a mirror 32, a cholesteric liquid crystal 33, a second lens portion (first emitting-side lens) 34 and a third lens portion (second emitting-side lens) 35. Character L designates an incident beam of light.

The polarized-light converting elemental device of FIG. 12 differs from the first embodiment 2-A shown in FIG. 7 by that the mirror 32 and the cholesteric liquid crystal 33 are disposed not perpendicular to and aslant to the optical axis. A parallel beam L of natural light enters the incident-side lens 31 whereby it converges at a focal plane and enters the cholesteric liquid crystal 33. The beam is then split into two circularly-polarized components that differs from each other by their rotation direction. Either one of the circularly-polarized components is admitted to pass through the cholesteric liquid crystal 33 and then the second emitting-side lens portion 34 wherefrom it emerges as a parallel beam of circularly-polarized light.

On the other hand, the other component is reflected from the cholesteric liquid crystal 33 is reflected again by the mirror 32, thereby it alters the rotation direction, i.e., is converted to a circularly-polarized beam having the reversed rotation direction. The beam passes through the cholesteric liquid crystal and the third lens portion 35 wherefrom it emerges as a parallel beam of circularly polarized light. Consequently, all the beams transmitted through the cholesteric liquid crystal are rays of unidirectional (clockwise or anticlockwise) circularly-polarized light. In this case, the cholesteric liquid crystal disposed at a specified angle to the optical axis to reflect all reflectable rays toward the mirror 32 that is disposed at a specified angle to the optical axis to reflect all the beams to pass through the cholesteric liquid crystal 33 and third lens portion 35 wherefrom the beam can be emitted as parallel rays of circularly polarized light. Accordingly, this construction somewhat increases an incident angle of the beam reflected from the mirror 32 to the cholesteric liquid crystal 33 but makes it possible to reuse the light rays that may be thrown out in the first embodiment 2-A shown in FIG. 7. An increased incident angle of the reflected light to the cholesteric liquid crystal may be improved by elongating the focal distance of the first lens portion 31.

(Embodiment 2-C)

Figure 13:
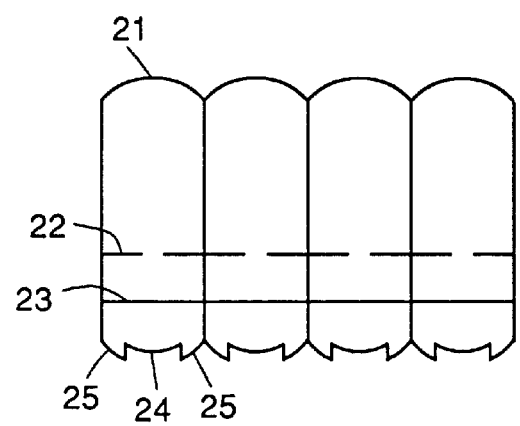
FIG. 13 is a side view of polarized-light converting element device array of the embodiment 2-C.

FIG. 13 is a side view of a polarized-light converting elemental device array of the embodiment 2-C which is an array of the polarized-light converting elemental devices according to the first embodiment 2-A. The elemental device array can be compact and inexpensive to manufacture. It can exhibit the increased uniformity of illuminating flux intensity. The element array may be constructed of the polarized-light converting elemental devices according to the second embodiment 2-B.

(Embodiment 2-D)

Figure 14:
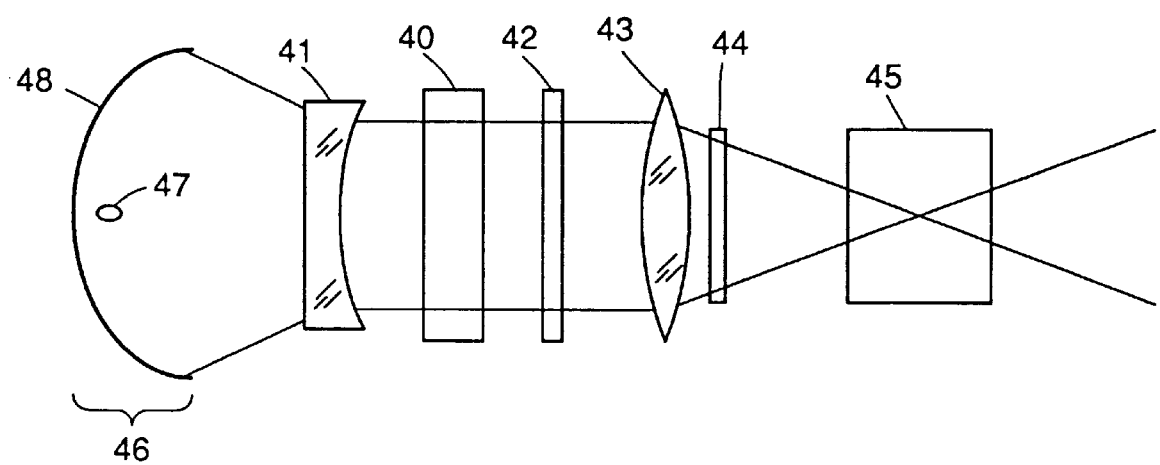
FIG. 14 is a conceptual construction view for explaining a projection-type display device according to the embodiment 2-C of the present invention.

FIG. 14 is a conceptual construction view of a projection-type display device according to the embodiment 2-D of the present invention. In FIG. 14, there are shown a polarized-light converting elemental device 40, a first condenser lens 41, a quarter-wave plate 42, a second condenser lens 43, a liquid crystal panel 44, a projecting optical system 45, a light source 46, a lamp 47 and a reflector 48. The projection-type display device according to the embodiment 2-D comprises the light source 46 including the lamp 47 for emitting natural light and the reflector 48, the first and second condenser lenses 41 and 43, the polarized-light converting element 40 for converting the natural light from the light source 46 into circularly polarized light rotating in a specified direction, the quarter-wave plate 42 for converting the circularly polarized light into linearly polarized light, the liquid crystal panel 44 and the projecting optical system 45 for projecting an image formed therein onto a display screen. The application of the polarized-light converting elemental device according to any one of the embodiments 2-A to 2-B or an array of the polarized-light converting elemental devices according to the embodiment 2-C in combination with the quarter-wave plate can convert the natural light into linearly polarized light rotating in a specified direction. The above-mentioned construction of the display device can attain an increased efficiency of using light as compared with the conventional liquid-crystal projector.

Figure 1B:
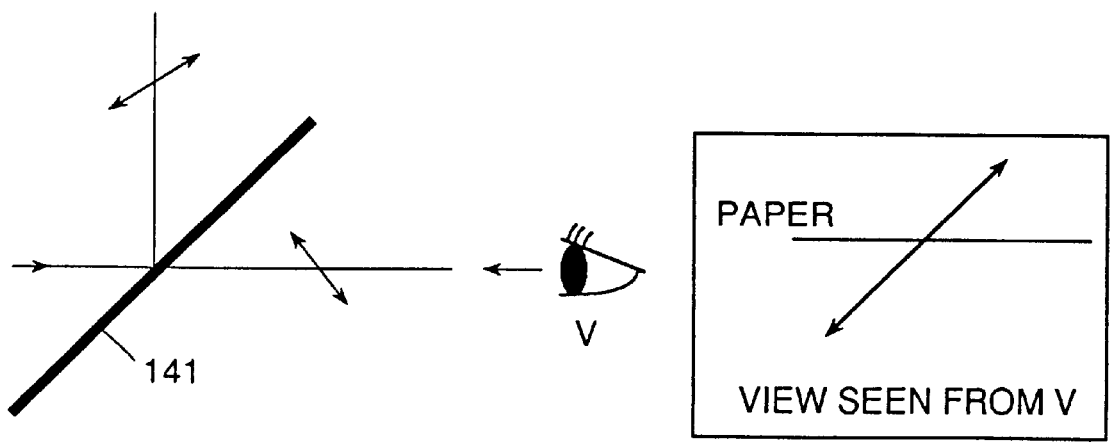
FIG. 1B is a view for explaining an example of a polarization direction of a beam separated by polarized-light separating means according to the present invention.

FIG. 1A is a view for explaining an example of a polarization direction of a beam separated by polarized-light separating means according to the prior art and FIG. 1B is a view for explaining an example of a polarization direction of a beam separated by polarized-light separating means according to the present invention. In FIGS. 1A and 1B, there are shown polarized-light separating optical elements 131 and 141. Japanese Laid-Open Patent Publication No. 3-192319 discloses a projection-type display device in which one of two polarized beams separated by the polarized-light separating optical element is doubly reflected to obtain the same polarization direction as that of the other polarized beam. The polarized-light rotating means of the device disclosed in Japanese Laid-Open Patent Publication No. 3-192319 rotates the polarization direction of one linearly polarized beam by doubly reflecting the beam by the mirror whose incident plane (a plane including the optical axis of the incident light and the normal of a mirror surface of the polarized-light rotating means at a point where the optical axis and the mirror surface intersect) is tilted at an angle of 45° from the polarization direction of the linearly polarized beam separated by a polarized-beam splitter. However, the polarization directions of the linearly polarized beams separated by the conventional polarized-light separating means are, respectively, perpendicular and parallel to the paper surface as shown in FIG. 1A. Consequently, the mirror must be disposed in such a way that the polarization direction of the linearly polarized beam makes an angle of 45° with the incident plane of the mirror. This necessarily causes the optical path of principal ray to be three-dimensionally located. Although the optical path is illustrated as two-dimensionally disposed in Japanese Laid-Open Patent Publication No. 3-192319, two separated beams can not be presented in practice on the same paper surface.

(Embodiment 3)

One aspect of the embodiment 3 is a polarized-light converting optical system (or a polarized-light converting elemental device) which is capable of converting natural light into a linearly polarized light having the same direction of polarization and includes a polarized-light separating optical element (or a polarized-light separating optical component) for separating incident light into two linearly polarized beams which are perpendicular to each other and each of which has a polarized direction making an angle of 45° with an incident plane including an optical axis of incident light and the normal at a point whereat the optical axis and a polarized-light separating surface intersect, and polarized-light rotating means for rotating the polarized direction of either one of two separated linearly polarized beams by 90° by reflecting said beam twice to match its polarized direction with that of the other beam.

The incident plane is defined as a plane that includes an optical axis of incident light falling on a polarized-light separating surface of the polarized-light separating optical element (or component) or a reflecting surface of an optical element and includes a normal of the polarized-light separating surface or the reflecting surface, which normal intersects the optical axis of the incident light. This term will be used hereinafter without repeating the definition.

Natural light falling on the polarized-light separating optical element (or a polarized-light separating optical component) is separated into two polarized beams which having polarization directions make an angle of 45° respectively with the incident plane and are perpendicular to each other. This effect can be realized by a polarized-light separating optical element possessing the birefringence while it can not be realized by a polarized-beam splitter using an optical membrane.

A birefringent optical member available in practice is as follows:

It is known that when a sheet of an organic-polymer film can exhibit double refraction (the birefringent property that has different refractive indexes in different directions) by being stretched in a certain direction since the film may vary its refractive index only in the stretched direction. When a laminate of two kinds of films having the same refractive index is stretched in a certain direction, it may have different refractive indexes of layers in the stretched direction but the same refractive index in a direction perpendicular to the stretched direction (if such kinds of the films are selected). Supposed that natural light (unpolarized light) enters perpendicularly into the laminate film, linearly polarized light polarized in the direction perpendicular to the stretched direction axis is not reflected at a boundary of films while linearly polarized light polarized in the stretched direction of the laminate is reflected at the boundary at the reflectance determined according to the following equation:

$$R = \left(\frac{n_2 - n_1}{n_2 + n_1}\right)^2 \times 100 \quad \text{[Mathematical Expression 1]}$$

(where $n_1$, $n_2$ are refractive indexes of two kinds of films in the stretched direction)

For example, if $n_1=1.4$ and $n_2=1.6$, the reflectance R of the linearly polarized light polarized in the stretched direction at the boundary between two layers (films) of the laminate is equal to 0.44%. Therefore, if a laminate has the repeatedly multilayer construction ($n_1$, $n_2$, $n_1$, . . . ), the reflectance in the stretched direction increased enough to split the incident natural light into two linearly polarized beams whose polarization-directions are perpendicular to each other.

A usually used polarized-beam splitter has an optical multilayer membrane and can split incident light by using a difference between reflectance ratios of polarized beams (p, s) slantingly entering thereinto. Therefore, it can split the incident light into merely polarized beams "s" and "p" being perpendicular and parallel to the incident plane respectively. On the other hand, the birefringent multilayer film has a stretch-axis direction settable at any desired direction relative to the incident plane. Namely, this film can split incident light into two linearly polarized beams that have any respective angles to the incident plane and are perpendicular to each other.

Any one of the split linearly polarized beams having different polarization directions making an angle of 45°, respectively, with the incident plane can be converted to a linearly polarized beam having a polarization direction perpendicular to the initial polarization direction by reflecting the beam twice. Accordingly, two linearly polarized beams separated by the above-mentioned means can be further matched with each other in their polarization directions (planes) by doubly reflecting either one of two beams.

Consequently, the incident natural light can be converted into the light polarized in the same direction. As described above, this polarized-light converting means has a two-dimensional construction and does not require three-dimensional system including a retardation plate for alternating the polarization directions. The means does not cause a change in color of the obtained polarized light and does not increase the dimension of the system.

The device according to the above-mentioned aspect of the present invention works on the same principle that the conventional device described in Japanese Laid-open Patent Publication No. 3-192319 "the device for changing the direction of polarization of the linearly polarized light by doubly reflecting the polarized light with the polarization direction tilted at 45° to the incident plane. In the construction of the device according to the present invention, light is already split into two linearly polarized beams tilted making an angle of 45° with the incident plane as shown in FIG. 1B wherein the incident plane is represented by a paper surface. This eliminates the necessity of disposing a mirror tilted in a three-dimensional space as in the conventional device "for causing linearly polarized light to fall onto a mirror tilted at an angle of 45° to the incident plane". In the device according to the present invention, a principal ray of light can be presented two-dimensionally on the paper surface. Namely, the device can be realized by a simple optical system that is easy to understand and has a two-dimensional structure with a reduced size. The device is formed as an array of elements expected to be further miniaturized and produced at a reduced cost.

Another aspect of the embodiment 3 includes a polarized-light separating optical element for separating natural light into two linearly polarized beams being perpendicular to each other and each having a polarizing direction making an angle of 45° with the incident plane, totally-reflecting means for converting either one of two separated linearly polarized beams into an elliptically polarized beam having a major axis parallel to a polarization direction of the other separated beam by totally reflecting the beam to be converted. This embodiment has a function to convert natural light into linearly polarized light having the same polarization direction.

Another aspect of the embodiment 3 includes a polarized-light separating optical element for separating natural light into two linearly polarized beams being perpendicular to each other and each having a polarizing direction making an angle of 45° with the incident plane, totally-reflecting means for converting either one of two separated linearly polarized beams into an elliptically polarized beam having a major axis parallel to a polarization direction of the other separated beam by totally reflecting the beam to be converted and a retardation plate for converting the elliptically-polarized beam reflected from the totally reflecting means into a completely linearly polarized beam. This embodiment has a function to convert natural light into linearly polarized light having the same polarization direction.

One of two linearly polarized beams separated by the polarized-light separating optical element is totally reflected inside a prism in such a way that the polarization direction of the linearly polarized beam may form an angle of 45° with the incident plane. Thus, it is converted into an elliptically-polarized light whose major axis is parallel to the polarization direction of the other linearly polarized beam.

Incident light passes from a medium of a refractive index $n_1$ to a medium of refractive index $n_2$ ($n_1 > n_2$) at an incident angle $\theta_1$ can be totally reflected when the incident angle $\theta_1$ satisfies the following condition:

$$\sin\theta_1 = \frac{n_2}{n_1} < 1 \qquad \text{[Mathematical Expression 2]}$$

At the same time, a phase difference $\delta = \delta p - \delta s$ ($\delta p$ is a phase shift polarized beam p and $\delta s$ is a phase shift of a polarized beam s) is introduced between the polarized beams p and s, which phase difference $\delta$ is determined according to the following equation:

$$\tan\left(\frac{\delta}{2}\right) = \left(\frac{n_2}{n_1}\right) \cos\theta_1 \frac{\sqrt{\left(\frac{n_1}{n_2}\right)^2 \sin^2\theta_1 - 1}}{\sin^2\theta_1} \qquad \text{[Mathematical Expression 3]}$$

The polarized beam after reflection becomes an elliptically polarized beam which major axis can be parallel to the polarization direction of the other separated linearly polarized beam if the medium and the incident angle were so selected that the phase difference $\delta$ may not exceed 90°. For example, when a linearly polarized beam having the polarization direction making an angle of 45° with the incident plane passes an inside glass layer having a refractive index $n_1=1.52$ and enters at an incident angle of 45° into an external air layer having a refractive index $n_2=1.0$, this incident light is totally reflected since the critical angle is 41.1°. At this time, the reflected beam has a phase difference $\delta=40.3°$ introduced between its polarized components p and s. Thus, the beam is converted into an elliptically polarized beam having the ellipticity of 0.27 and having a major axis disposed parallel to the other linearly polarized beam since the phase difference is smaller than 90°.

As described above, the device according to the present invention can split natural light into two linearly polarized beams being perpendicular to each other and each having a polarizing direction making an angle of 45° with the incident plane and convert either one of two separated linearly polarized beams by total reflection into an elliptically polarized beam having a major axis parallel to a polarization direction of the other separated beam. Thus, two separated polarized beams have a substantially matched direction of polarization.

The totally reflected elliptically-polarized beam can be further converted through a suitable retardation plate into a complete linearly polarized beam, thus increasing the efficiency of converting the incident light. This embodiment is simple in construction and is capable of converting natural light into unidirectional polarized light without using a polarized-beam splitter or a polarized-light separating membrane-deposited means. Consequently, this embodiment can be realized at an inexpensive cost and in a compact two-dimensional system construction (with no need for three-dimensional arrangement of system components).

Referring to accompanying drawings, embodiment 3 of the present invention will be described below in detail:

(Embodiment 3-A)

Figure 15:
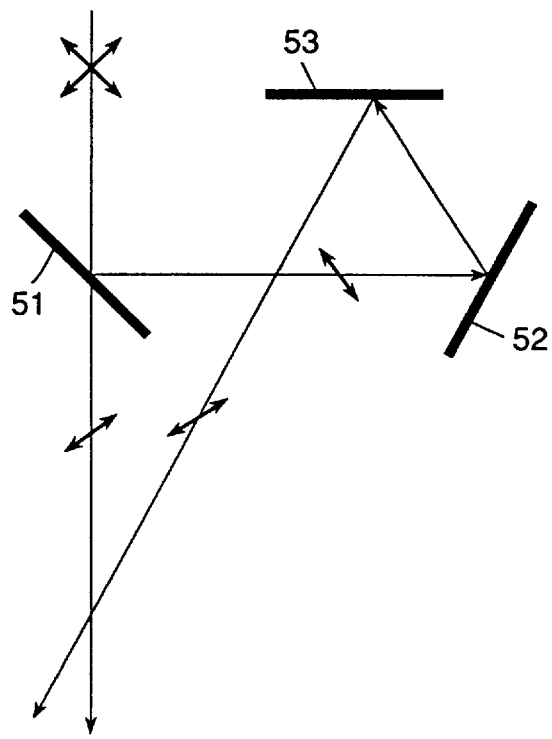
FIG. 15 is a conceptual illustration of an optical system construction and an optical path for explaining a polarized-light converting optical system according to the embodiment 3-A of the present invention.

FIG. 15 is a conceptual illustration of an optical system construction and an optical path for explaining a polarized-light converting optical system according to the embodiment 3-A of the present invention. In FIG. 15, numeral 51 designates a polarized-light separating optical element and numerals 52 and 53 designate a first mirror and a second mirror respectively.

Figure 21:
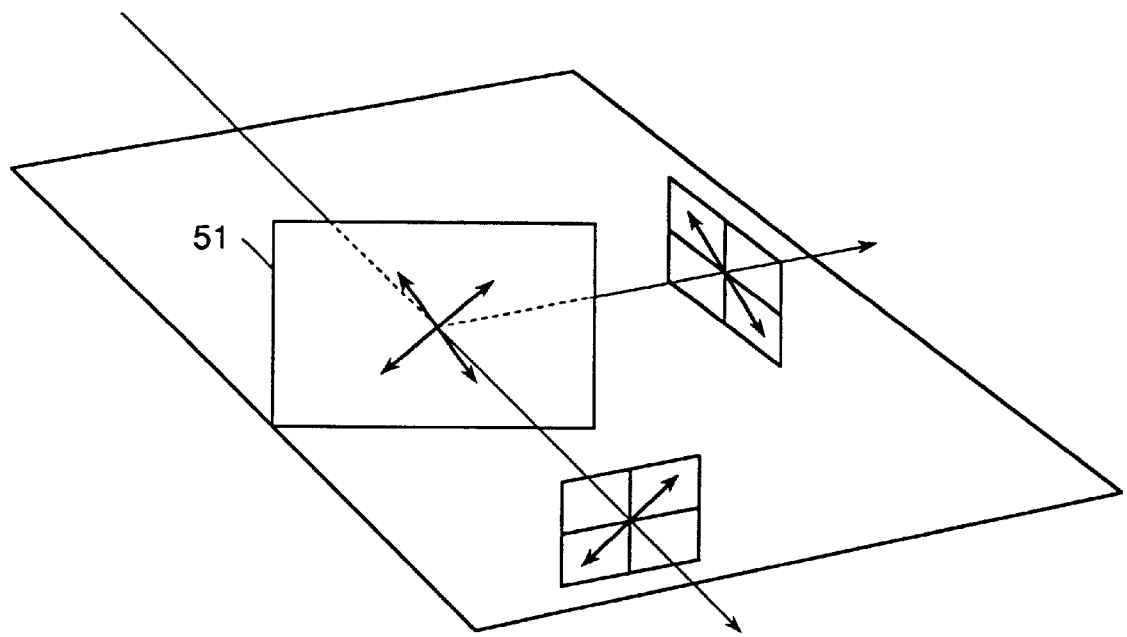
FIG. 21 is a view for explaining the property of polarized-light separating optical element according to the embodiment 3 or the characteristic of the polarized beams separated by said polarized-light separating optical element.

FIG. 21 is a view for explaining the optical property of polarized-light separating optical element according to the embodiment 3 or the property of the polarized beams separated by said polarized-light separating optical element.

As shown in FIG. 21, natural light falls on the polarized-light separating element 51 by which it is split into two linearly polarized beams whose polarization directions make an angle of 45° with an incident plane and are perpendicular to each other. In the optical system shown in FIG. 15, one of the separated linearly polarized beams is reflected from the polarized-light separating element 51 is doubly reflected by the first and second mirrors 52 and 53, whereby the polarizing direction of the beam is rotated by 90° and becomes the same as that of the beam transmitted through the polarized-light separating optical element. Thus, the natural incident light is converted into linearly polarized light having the same polarization direction.

(Embodiment 3-B)

Figure 16:
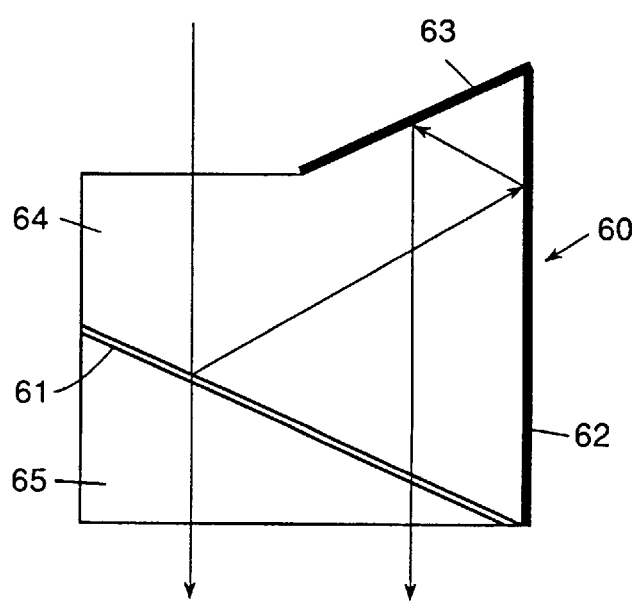
FIG. 16 is a conceptual illustration of an optical elemental device construction and optical path for explaining a polarized-light converting element according to the embodiment 3-B of the present invention.

FIG. 16 is a conceptual illustration of an optical elemental device construction and optical path for explaining a polarized-light converting component according to the embodiment 3-B of the present invention. In FIG. 16, there is shown a polarized-light converting elemental device 60 including a polarized-light separating optical element 61, a first deposited mirror 62, a second deposited mirror 63, a first glass portion 64 and a second glass portion 65. The polarized-light converting elemental device 60 according to this embodiment of the present invention is composed mainly of the first glass portion 64 and the second glass portion 65. The first glass portion 64 having the first deposited mirror 62 and the second deposited mirror 63, which are mirror films deposited the glass surface as shown in FIG. 16. The polarized light separating optical component 61 is sandwiched between the first glass portion 64 and the second glass portions 65. The second deposited mirror 63 deposited on the first glass portion 64 has such a reflecting angle that a light beam reflected from the polarized-light separating optical component 61 and then the first deposited mirror 62 may be reflected and propagates in a path parallel to a path of the beam transmitted through the polarized-light separating optical component 61.

Parallel beam of natural incident light enters the first glass portion 64 and reaches the polarized-light separating optical component 61 by which it is separated into two linearly polarized beams whose polarization directions are perpendicular to each other and make an angle of 45° with an incident plane. One of two separated linearly polarized beams transmits through the polarized-light separating optical component 61 while the other is reflected therefrom and further reflected twice first by the first deposited mirror 62 and next by the second deposited mirror 63, whereby the polarizing direction of the beam is rotated by 90°) and becomes the same as that of the beam transmitted through the polarized-light separating optical component 61. Thus, the natural incident light is converted into linearly polarized light having the same polarization direction.

(Embodiment 3-C)

Figure 17:
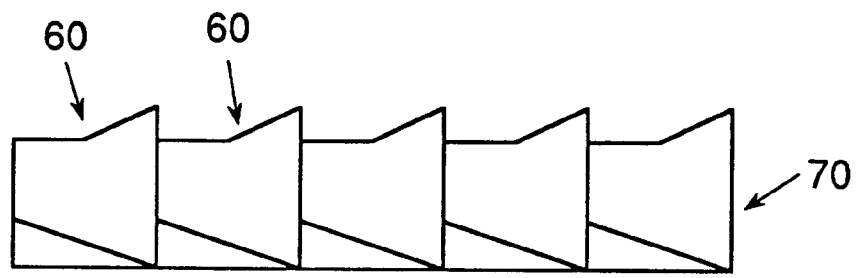
FIG. 17 is a construction view of a polarized-light converting elemental device array according to the embodiment 3-C of the present invention.

FIG. 17 is a construction view of a polarized-light converting elemental device array according to the embodiment 3-C of the present invention. In FIG. 17, numeral 60 denotes a polarized-light converting elemental device and numeral 70 denotes a polarized-light converting elemental device array.

The polarized-light converting elemental device array is realized by arranging the polarized-light converting elemental devices 60 shown FIG. 16 to form an array as shown in FIG. 17. The array may have a reduced thickness and attain an improved uniformity of light intensity. It is inexpensive to manufacture and contributes miniaturization of the optical system.

Figure 18:
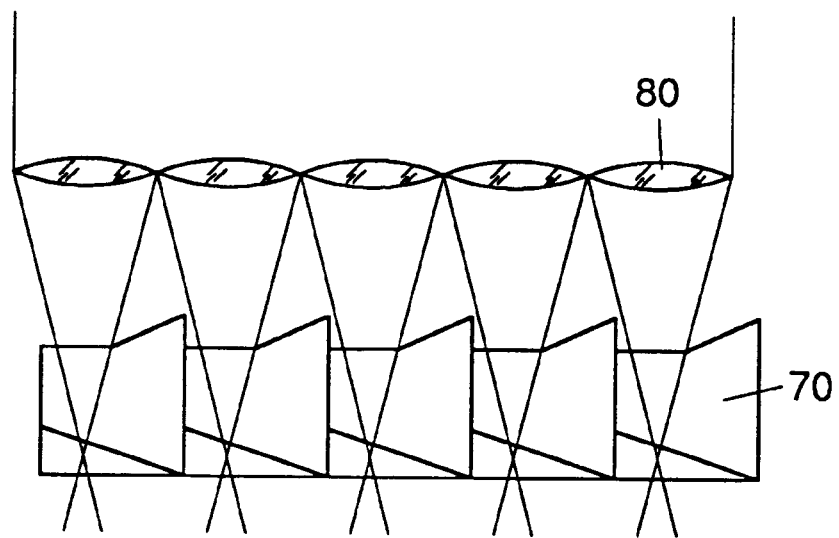
FIG. 18 is a view for explaining a lens array provided for conversing light into a polarized-light converting elemental device array according to the embodiment 3-C.

FIG. 18 is a view for explaining a lens array provided for conversing light into a polarized-light converting elemental device array according to the embodiment 3-C. In FIG. 18, numeral 70 denotes a polarized-light converting elemental device array and numeral 80 denotes a lens array.

The provision of an array of incident-light collecting lens (e.g., fly's eye lenses) 80 (FIG. 18) at the incident side of the polarized-light converting elemental device array 70 (FIG. 17) is desirable to eliminate a possible loss of incident light by reflection by a mirror deposited on the converting elemental device array 70. The application of this optical system can considerably improve the efficiency of using incident light as compared with a conventional liquid-crystal projector. Furthermore, the array of the polarized-light converting elemental devices in combination with the lens array may have a reduced size in thickness and can be manufactured at a reduced cost. The uniformity of intensity of light emittable from the array is also improved. The optical system can be miniaturized.

(Embodiment 3-D)

Figure 19:
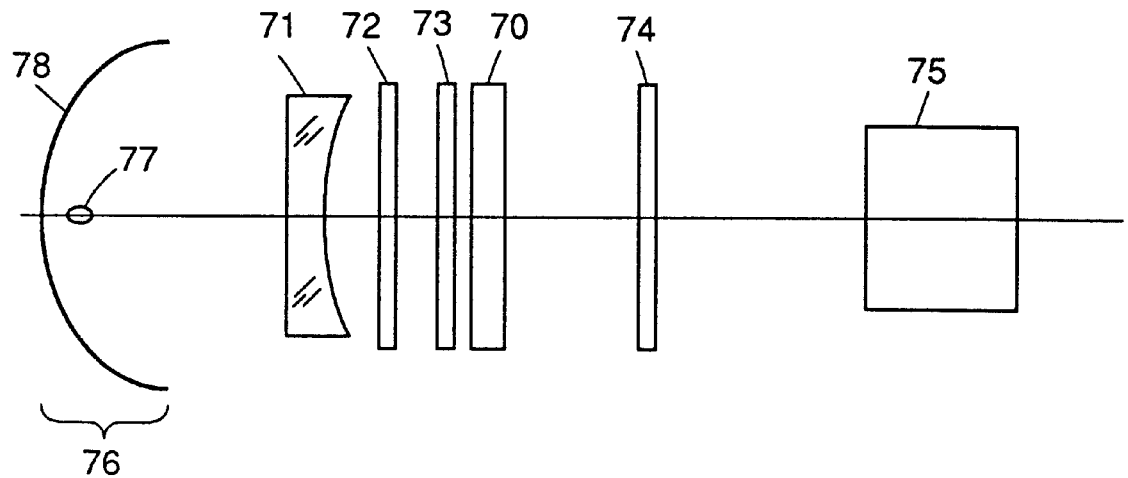
FIG. 19 is a schematic construction view for explaining a projection-type display device according to the embodiment 3-D of the present invention.

FIG. 19 is a schematic construction view for explaining a projection-type display device according to the embodiment 3-D of the present invention. There is illustrated an optical system of a liquid crystal projector in which a polarized-light converting elemental device array according to the embodiment 3-D is applied. The optical system of the liquid-crystal projector includes a light source 76 consisting of a natural-light emitting lamp 77 and a reflector 78, condenser lens 71, an incident-side fly's eye lens 72, an outgoing-side fly's eye lens 73, a polarized-light converting elemental device array 70 for converting the natural light from the light source 76 into linearly polarized light having a specified polarization direction according to the present invention, a liquid crystal panel 74 and a projecting optical system 75 for projecting an image on a display screen.

(Embodiment 3-E)

Figure 20:
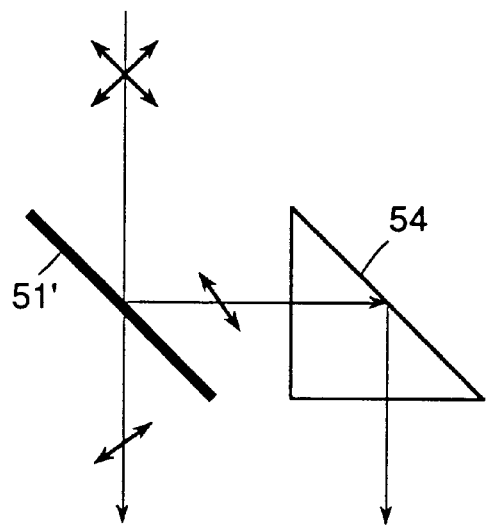
FIG. 20 is a conceptual illustration of an optical system construction and an optical path for explaining a polarized-light converting optical system according to embodiment 3-E of the present invention.

FIG. 20 is a conceptual illustration of an optical system construction and an optical path for explaining a polarized-light converting optical system according to embodiment 3-E of the present invention. In FIG. 20, numeral 51' denotes a polarized-light separating optical element and numeral 54 denotes a prism.

In a similar way as shown in FIG. 21, the polarized-light separating optical element 51' separates incident natural light into two linearly polarized beams having the polarization directions being perpendicular to each other and making an angle 45° with an incident plane. One of the separated beams directly passes through the polarized-light separating optical element 51' and the other is reflected therefrom and totally reflected by the prism 54. As the result, the beam is converted into an elliptically-polarized light whose major axis is substantially parallel to the polarization direction of the linearly polarized beam directly transmitted through the polarized-light separating optical element 51'. Therefore, the above-described optical system can convert the natural incident light into linearly polarized light having the same polarization direction.

(Embodiment 3-F)

Figure 22:
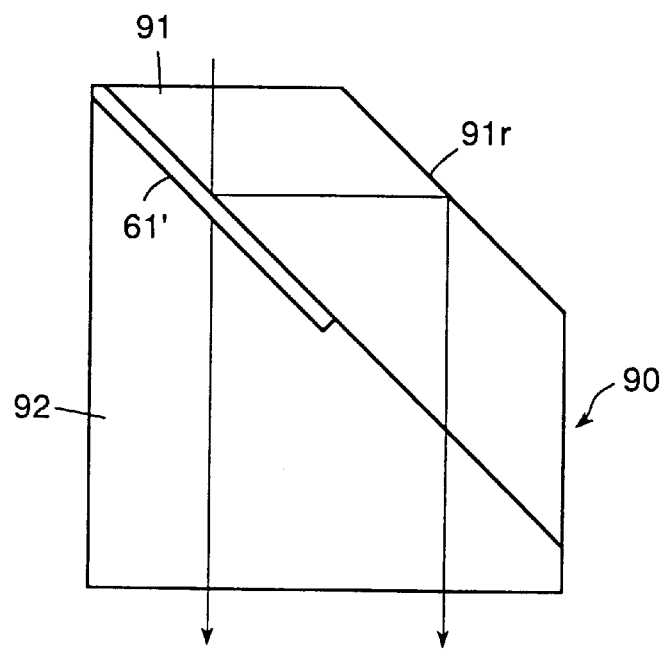
FIG. 22 is a conceptual illustration of an optical elemental device construction and optical path for explaining a polarized-light converting elemental device according to the embodiment 3-F of the present invention.

FIG. 22 is a conceptual illustration of an optical elemental device construction and optical path for explaining a polarized-light converting elemental device according to the embodiment 3-F of the present invention. There is shown a polarized-light separating component 61', a polarized-light converting elemental device 90, a first glass portion 91, a totally reflecting surface 91r and a second glass portion 92.

The polarized-light converting elemental device 90 according to the embodiment 3-F is composed mainly of the first glass portion 91 and the second glass portion 92. The polarized-light separating optical component 61' is sandwiched between the first glass portion 91 and the second glass portions 92. The first glass portion 91 made of glass material having a specified refractive index and has a specified incident angle to the totally reflecting surface 91r so as to totally reflect light rebound from the polarized-light separating optical component 61'. The totally reflecting surface 91r and the polarized-light separating optical component 61' are disposed parallel to each other so that reflected light from the totally reflecting surface 91r may travel in the same direction as the light directly transmitted though the polarized-light separating optical component 61'.

Parallel beam of natural incident light enters the first glass portion 91 and reaches the polarized-light separating optical component 61' by which it is separated into two linearly polarized beams whose polarization directions are perpendicular to each other and make an angle of 45° with an incident plane. One of two separated linearly polarized beams directly transmits through the polarized-light separating optical component 61' while the other is reflected therefrom and further totally reflected by the totally reflecting surface 91r of the first glass portion 91, whereby the beam is converted into elliptically polarized light whose major axis is parallel to the polarization direction of the beam directly transmitted through the polarized-light separating optical component 61'. Thus, the natural incident light is converted into linearly polarized light having the same polarization direction.

(Embodiment 3-G)

Figure 23:
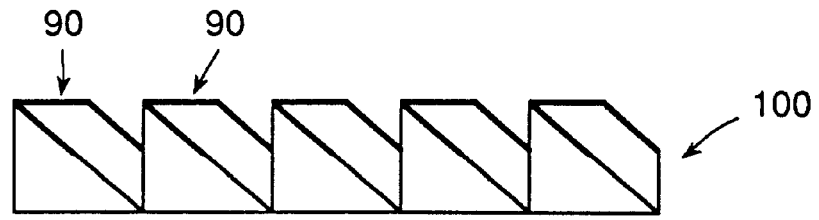
FIG. 23 is a construction view of a polarized-light converting elemental device array according to embodiment 3-F of the present invention.

FIG. 23 is a construction view of a polarized-light converting elemental device array according to embodiment 3-G of the present invention. In FIG. 23, numeral 90 denotes a polarized-light converting elemental device and numeral 100 denotes a polarized-light converting elemental device array.

The polarized-light converting elemental device array is realized by arranging the polarized-light converting elemental device 90 shown FIG. 22 to form an array as shown in FIG. 23. The array may have a reduced thickness and attain an improved uniformity of light intensity. It is inexpensive to manufacture and contributes miniaturization of the optical system.

(Embodiment 3-H)

Figure 24:
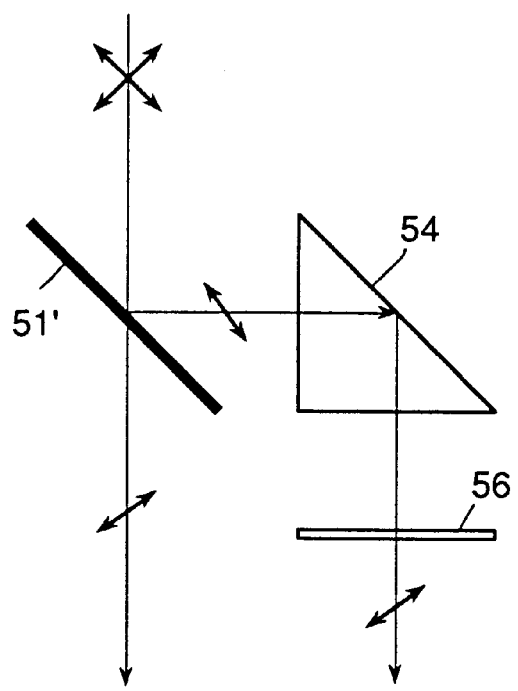
FIG. 24 is a conceptual illustration of an optical system construction and an optical path for explaining a polarized-light converting optical system according to the embodiment 3-H of the present invention.

FIG. 24 is a conceptual illustration of an optical system construction and an optical path for explaining a polarized-light converting optical system according to the embodiment 3-H of the present invention. In FIG. 24, numeral 56 designates a retardation plate and other components similar to those shown in FIG. 20 are given the same reference numerals.

The polarized-light separating optical element 51' separates incident natural light into two linearly polarized beams having the polarization directions being perpendicular to each other and making an angle 45° with an incident plane. One of the separated beams directly passes through the polarized-light separating optical element 51' and the other is reflected therefrom and totally reflected by the prism 54. As the result, the beam is converted into an elliptically-polarized light whose major axis is substantially parallel to the polarization direction of the linearly polarized beam directly transmitted through the polarized-light separating optical element 51'. The elliptically polarized beam then enters the retardation plate 56 that is so disposed and preset to introduce a specified phase difference between components of elliptically-polarized beam and convert it into a linearly polarized beam whose polarization direction corresponds to the direction of the major axis. Consequently, the beam emerges therefrom as a complete linearly polarized light having the same polarization direction as the linearly polarized beam directly transmitted through the polarized-light separating optical element 51'. Therefore, the above-described optical system can convert the natural incident light into linearly polarized light having the same polarization direction.

(Embodiment 3-I)

Figure 25:
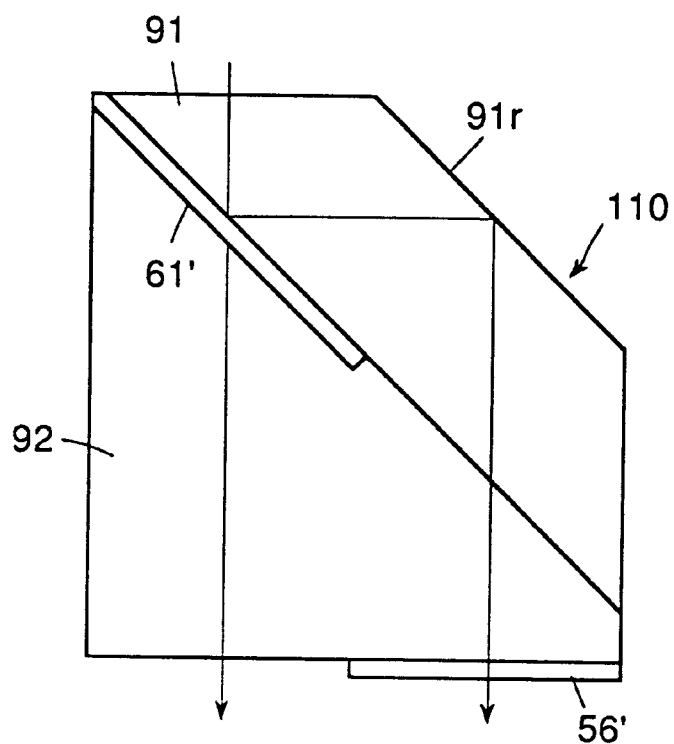
FIG. 25 is a conceptual illustration of an optical elemental device construction and optical path for explaining a polarized-light converting elemental device according to the embodiment 3-I of the present invention.

FIG. 25 is a conceptual illustration of an optical elemental device construction and optical path for explaining a polarized-light converting elemental device according to a the embodiment 3-I of the present invention. In FIG. 25, numeral 56' designates a retardation plate and other components similar to those shown in FIG. 22 are given the same reference numerals.

The polarized-light converting elemental device according to this embodiment 3-I is composed mainly of the first glass portion 91 and the second glass portion 92. The polarized-light separating optical component 61' is sandwiched between the first glass portion 91 and the second glass portions 92. The first glass portion 91 made of glass material having a specified refractive index and has a specified incident angle to the totally reflecting surface 91r so as to totally reflect light rebound from the polarized-light separating optical component 61'. The totally reflecting surface 91r and the polarized-light separating optical component 61' are disposed parallel to each other so that reflected light from the totally reflecting surface 91r may travel in the same direction as the light directly transmitted through the polarized-light separating optical component 61'.

Parallel beam of natural incident light enters the first glass portion 91 and reaches the polarized-light separating optical component 61' by which it is separated into two linearly polarized beams whose polarization directions are perpendicular to each other and make an angle of 45° with an incident plane. One of two separated linearly polarized beams directly transmits through the polarized-light separating optical component 61' while the other is reflected therefrom and further totally reflected by the totally reflecting surface 91r of the first glass portion 91, whereby the beam is converted into elliptically polarized light whose major axis is parallel to the polarization direction of the beam directly transmitted through the polarized-light separating optical component 61'. The elliptically polarized beam then enters the retardation plate 56' that is so disposed and preset to introduce a specified phase difference between components of elliptically-polarized beam and convert it into a linearly polarized beam whose polarization direction corresponds to the direction of the major axis. Consequently, the beam emerges therefrom as a complete linearly polarized light having the same polarization direction as the linearly polarized beam directly transmitted through the polarized-light separating optical component 61'. Therefore, the above-described optical system can convert the natural incident light into linearly polarized light having the same polarization direction.

(Embodiment 3-J)

Figure 26:
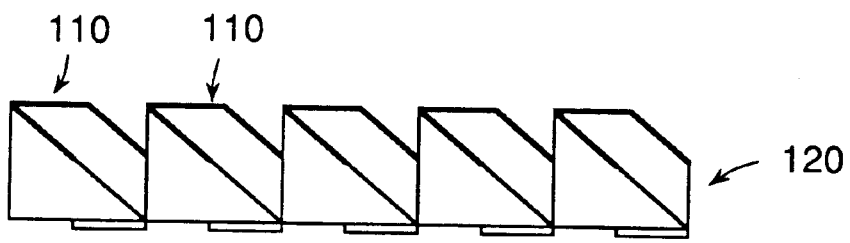
FIG. 26 is a construction view of a polarized-light converting elemental device array according to the embodiment 3-J of the present invention.

FIG. 26 is a construction view of a polarized-light converting elemental device array according to the embodiment 3-J of the present invention. In FIG. 26, numeral 110 denotes a polarized-light converting elemental device and numeral 120 denotes a polarized-light converting elemental device array.

The polarized-light converting elemental device array is realized by arranging the polarized-light converting elemental devices 110 shown FIG. 25 to form an array as shown in FIG. 26. The array may have a reduced thickness and attain an improved uniformity of light intensity. It is inexpensive to manufacture and contributes miniaturization of the optical system.

(Embodiment 3-K)

Figure 27:
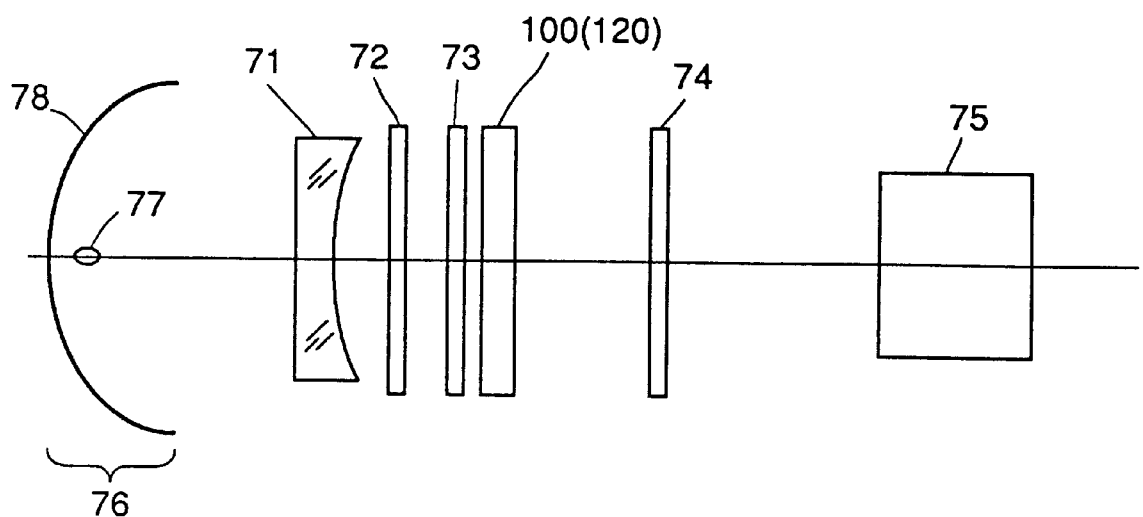
FIG. 27 is a schematic construction view for explaining a projection-type display device according to the embodiment 3-K of the present invention, which also represents another example of an optical system of a liquid crystal projector using a polarized-light converting elemental device according to the present invention.

FIG. 27 is a schematic construction view for explaining a projection-type display device according to the embodiment 3-K of the present invention, which also represents another example of an optical system of a liquid crystal projector using a polarized-light converting elemental device array according to the present invention. The optical system of the liquid-crystal projector includes a light source 76 consisting of a natural-light emitting lamp 77 and a reflector 78, condenser lens 71, an incident-side fly's eye lens 72, an outgoing-side fly's eye lens 73, a polarized-light converting elemental device array 100 (120) for converting the natural light from the light source 76 into linearly polarized light having a specified polarization direction according to the present invention, a liquid crystal panel 74 and a projecting optical system 75 for projecting an image on a display screen.

Figure 28:
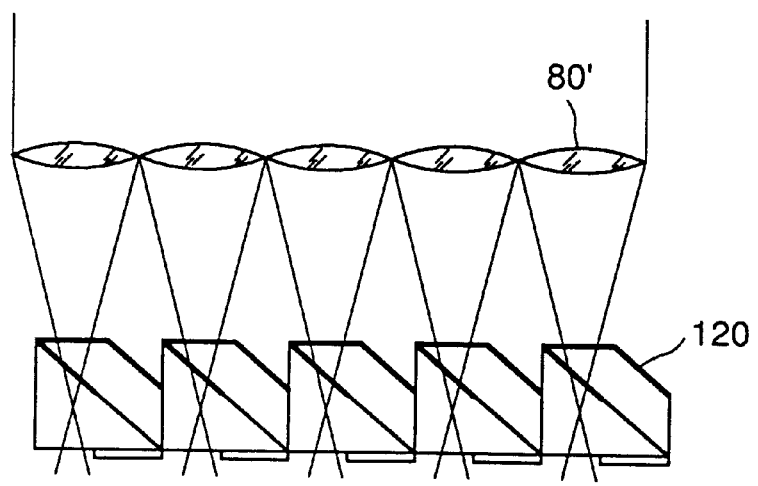
FIG. 28 is illustrative of an array of lenses for collecting beams of light to be fed to a polarized-light converting elemental device according to the embodiment 3-K of the present invention.

FIG. 28 is illustrative of an array of lenses for collecting beams of light to be fed to a polarized-light converting elemental device array according to the embodiment 3-K of present invention. In FIG. 28, numeral 80' designates a lens array. The provision of an array of incident-light collecting lens (e.g., fly's eye lenses) 80' shown in FIG. 28 at the incident side of the polarized-light converting elemental device array 100 (120) of FIG. 23 (or 26) is desirable to eliminate a possible loss of incident light by reflection by a mirror deposited on the converting elemental device array 100 (120). The application of this optical system can considerably improve the efficiency of using incident light as compared with a conventional liquid-crystal projector. Furthermore, the array of the polarized-converting elemental devices in combination with the lens array may have a reduced size in thickness and can be manufactured at a reduced cost. The uniformity of intensity of light emittable from the array is also improved. The optical system can be miniaturized.

The advantages of the present invention are as follows:

(1) A polarized-light converting elemental device according to the present invention can be suitably applied for a liquid crystal panel and a liquid crystal projector. Namely, this elemental device can produce a circularly polarized light having the same rotation direction with no loss of incident light. The light can be converted to a linearly polarized light through a retardation plate. Application of this elemental device assures effective illumination of a liquid crystal panel and a liquid crystal display device since the light emerges from the element in two directions with a specified angle of divergence.

(2) A polarized-light converting elemental device according to the present invention, in addition to the feature of the above item (1), is constructed by using glass sheets and can enter light at a small incident angle into a cholesteric crystal layer by the effect of refraction of glass.

(3) A polarized-light converting elemental device according to the present invention, in addition to the feature of the above item (1) or (2), is assembled by using glass suitable for practical application.

(4) According to the present invention, it is possible to provide a projection-type display device which has an improved efficiency of using incident light, which attained by eliminating the 50%-loss of light in an incident polarizing plate.

(5) A polarized-light converting elemental device according to the present invention can effectively convert unpolarized natural light into unidirectional (clockwise or anticlockwise) circularly polarized light. The elemental device is provided with incident and outgoing lens systems that can be optimally adjusted in focal distance and aperture size to accurately control an illuminating area without causing unevenness of light intensity therein through the is process of converting the light. Furthermore, the obtained light can be easily converted further to a linearly polarized light through a retardation plate, which light is suitably used for illuminating liquid-crystal panels and liquid-crystal projectors.

(6) A polarized-light converting elemental device according to the present invention, in addition to the feature of the above item (5), can produce parallel beams of unidirectional circularly-polarized light that is suitable to use in liquid-crystal panels and liquid-crystal projectors.

(7) A polarized-light converting elemental device according to the present invention, in addition to the feature of the above item (5) or (6), is featured by that the cholesteric liquid crystal and the reflecting optical element are disposed aslant to the optical axis of the incident light, realizing an increased efficiency of using the incident light.

(8) A polarized-light converting elemental device array according to the present invention is constructed of polarized-light converting elemental devices disposed in array to form a single solid unit having a very small size, which is very light in weight and inexpensive to manufacture. It assures improved uniformity of light intensity.

(9) According to the present invention, it is possible to provide a projection-type display device that can project a bright image by effectively using incident light, which attained by eliminating the 50%-loss of incident light caused in an incident polarizing plate of the conventional device.

(10) A polarized-light converting optical system according to of the present invention can effectively and accurately convert natural light into unidirectional linearly polarized light. This optical system can lealize further simple and miniaturized structure.

(11) A polarized-light converting optical system according to the present invention can obtain a linearly polarized beam and an elliptically polarized beam, both beams having the same polarization direction, by separating natural light into two linearly polarized beams and totally reflecting one of two beams. This optical system realizes an increased efficiency of using incident light since it can use light that is lost in the conventional device.

(12) A polarized-light converting optical system according to the present invention further includes a retardation plate, in addition to the feature of the above item (11), can therefore convert the elliptically polarized light obtained by total reflection into the linearly polarized light. This optical system can supply highly linearly polarized light.

(13) A polarized-light separating element according to the present invention is simple and compact and can realize a further miniaturized polarized-light converting optical system that also has the feature defined in any one of the above items (10) to (12).

(14) A polarized-light converting elemental device according to the present invention can effectively and accurately convert incident natural light into unidirectional polarized light. This elemental device is can realize further simple and miniaturized structure.

(15) A polarized-light converting elemental device according to the present invention can obtain a linearly polarized beam and an elliptically polarized beam, both beams having the same polarization direction, by separating natural light into two linearly polarized beams and totally reflecting one of two beams. This optical elemental device realizes an increased efficiency of using incident light since it can use reflected light that is lost in a conventional device.

(16) A polarized-light converting optical elemental device according to the present invention further includes a retardation plate, in addition to the feature of the above item (15), can therefore convert the elliptically polarized light obtained by total reflection into the linearly polarized light. This optical elemental device can supply highly linearly polarized light.

(17) A polarized-light converting elemental device according to the present invention, in addition to the feature of any one of the above items (14) to (16), is further featured by the use of a polarized-light separating component that is simple and can realize further miniaturization of the polarized-light converting elemental device.

(18) A polarized-light converting elemental device according to the present invention can effectively and accurately convert incident natural light into unidirectional polarized light. This elemental device array is simple and compact and can be manufactured at a low cost.

(19) According to the invention, it is possible to provide a projection-type display device which can project a bright image by effectively using incident light.

We claim:

1. A polarized-light converting elemental device provided with a cholesteric liquid crystal layer for reflecting either one of clockwise circularly polarized light and anticlockwise circularly polarized light and transmitting the other, a first reflecting optical element array composed of first reflecting optical elements arranged in an array and a second reflecting optical element array composed of second reflecting optical elements arranged in an array, wherein the first reflecting optical element array is disposed to reflect a part of natural light falling on the polarized-light converting elemental device and transmit the remaining part of the natural light that is split into two light rays propagating in two directions and entering into the cholesteric liquid crystal layer at first and second different incident angles respectively, and the second reflecting optical element array reverses a rotary direction of circularly polarized light reflected from the cholesteric liquid crystal layer and causes respective light rays reflected from the cholesteric liquid crystal layer to enter into the cholesteric liquid crystal layer at the first and second incident angles respectively, thereby incident light acted by the first and second reflecting optical element arrays and transmitted through the cholesteric liquid crystal layer is converted to two rays that emerge as circularly polarized light rays having the same rotating direction and propagate separately in two different directions.

2. A polarized-light converting elemental device as defined in claim 1, wherein the first reflecting optical element array, the second reflecting optical element array and the cholesteric liquid crystal layer are combined with glass to form a single solid unit.

3. A polarized-light converting elemental device as defined in claim 1 or 2, wherein the polarized-light converting elemental device is a combination of an array of reflecting optical element blocks, each block composed of a glass block with the first reflecting optical element disposed thereon and the second optical element disposed thereon, and a cholesteric liquid-crystal glass portion composed of the cholesteric liquid-crystal layer.

4. A projection-type display device comprising a polarized-light converting elemental device define in claim 3, a retardation plate for converting circularly polarized light from the polarized-light converting elemental device into linearly polarized light, transmission-type light valve for modulating the linearly polarized light and projecting means for projecting the modulated light.

5. A projection-type display device comprising a polarized-light converting elemental device defined in claim 1 or 2, a retardation plate for converting circularly polarized light from the polarized-light converting elemental device into linearly polarized light, transmission-type light valve for modulating the linearly polarized light and projecting means for projecting the modulated light.

6. A polarized-light converting elemental device comprising a first lens portion for collecting natural light, a cholesteric liquid crystal for reflecting either one of the clockwise circularly polarized light and anticlockwise circularly polarized light and transmitting the other, a reflecting optical element disposed in an optical path between the first lens portion and the cholesteric liquid crystal and having an opening provided therein for passing the collected light, said reflecting optical element reversing the direction of rotation of circularly polarized light reflected from the cholesteric liquid crystal and re-reflecting said light toward the cholesteric liquid crystal, a second lens portion for entering therein light having passed through the cholesteric liquid crystal without being re-reflected by the reflecting optical element, a third lens portion for entering therein light having re-reflected by the reflecting optical element and passed through the cholesteric liquid crystal, wherein natural light collected through the first lens portion is converted to circularly-polarized light rotating in the same direction, which then passes through the second and third lens portions.

7. A polarized-light converting elemental device as defined in claim 6, wherein components of the converting elemental device are arranged so that light outgoing from the second and third lens portions are parallel rays when the natural light incoming into the first lens portion is parallel.

8. A polarized-light converting elemental device as defined in claim 6 or 7, wherein the cholesteric liquid crystal and the reflecting optical element are disposed at an angle relative to the optical axis of the incident natural light not to allow the light reflected from the cholesteric liquid crystal to pass through the opening provided in the reflecting optical element, thus eliminating loss of the light.

9. A polarized-light converting elemental device array wherein a plurality of the polarized-light converting elemental devices defined in claim 8 are arranged in array.

10. A projection-type display device comprising the polarized-light converting elemental device defined in claim 8, a light source, a retardation plate for converting circularly polarized light from the polarized-light converting elemental device into linearly polarized light, a transmission-type light valve for modulating the linearly polarized light and projecting means for projecting the modulated light.

11. A polarized-light converting elemental device array wherein a plurality of the polarized-light converting elemental devices defined in claim 6 or 7 are arranged in array.

12. A projection-type display device comprising the polarized-light converting elemental device array defined in claim 11, a light source, a retardation plate for converting circularly polarized light from the polarized-light converting elemental device array into linearly polarized light, a transmission-type light valve for modulating the linearly polarized light and projecting means for projecting the modulated light.

13. A projection-type display device comprising the polarized-light converting elemental device defined in claim 6 or 7, a light source, a retardation plate for converting circularly polarized light from the polarized-light converting elemental device into linearly polarized light, a transmission-type light valve for modulating the linearly polarized light and projecting means for projecting the modulated light.

* * * * *